(12) United States Patent
Lin et al.

(10) Patent No.: US 11,296,908 B2
(45) Date of Patent: *Apr. 5, 2022

(54) USING MULTIPLE ETHERNET VIRTUAL PRIVATE NETWORK (EVPN) ROUTES FOR CORRESPONDING SERVICE INTERFACES OF A SUBSCRIBER INTERFACE

(71) Applicant: Juniper Networks, Inc., Sunnyvale, CA (US)

(72) Inventors: Wen Lin, Andover, MA (US); Pankaj Kumar Gupta, Fremont, CA (US); Babu Singarayan, San Jose, CA (US); Sharmila Koppula, Campbell, CA (US); Manish Gupta, San Jose, CA (US); Kapil Arora, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 1 day.

This patent is subject to a terminal disclaimer.

(21) Appl. No.: 16/907,908

(22) Filed: Jun. 22, 2020

(65) Prior Publication Data

US 2020/0322183 A1 Oct. 8, 2020

Related U.S. Application Data

(63) Continuation of application No. 16/127,101, filed on Sep. 10, 2018, now Pat. No. 10,693,679.

(30) Foreign Application Priority Data

Jun. 25, 2018 (IN) .............................. 201841023551

(51) Int. Cl.
*G06F 15/16* (2006.01)
*H04L 12/46* (2006.01)
(Continued)

(52) U.S. Cl.
CPC ...... *H04L 12/4645* (2013.01); *H04L 12/4633* (2013.01); *H04L 43/0817* (2013.01);
(Continued)

(58) Field of Classification Search
CPC ....... H04L 45/245; H04L 45/28; H04L 45/50; H04L 45/66; H04L 12/4645; H04L 12/4633
(Continued)

(56) References Cited

U.S. PATENT DOCUMENTS 7,633,860 B2 * 12/2009 Li ....................... H04L 41/0668
370/225
7,961,595 B2 * 6/2011 Ng ...................... H04W 60/005
370/216
(Continued)

FOREIGN PATENT DOCUMENTS

CN 107566263 A 1/2018
CN 107612834 A 1/2018
(Continued)

OTHER PUBLICATIONS

First Office Action and Search Report, and translation thereof, from counterpart Chinese Application No. 201910549536.1, dated Oct. 10, 2020, 15 pp.
(Continued)

*Primary Examiner* — Moustafa M Meky
(74) *Attorney, Agent, or Firm* — Shumaker & Sieffert, P.A.

(57) ABSTRACT

Techniques are disclosed for an Ethernet Virtual Private Network (EVPN) Virtual Private Wire Service (VPWS) network with service interface-aware forwarding. In one example, a first network device signals to a second network device, using EVPN route advertisements, a multi-service service tunnel to transport network packets for a plurality of
(Continued)

services. The services are identifiable by virtual local area network (VLAN) identifiers in the packets. The first network device is configured with a single transport interface for the service tunnel and the single transport interface is configured with respective service interfaces for the services. The first network device detects failure of a failed service interface of the service interfaces and outputs, in response to the failure, an EVPN route withdrawal message for the service tunnel that identifies the service corresponding to the failed service interface.

20 Claims, 6 Drawing Sheets

(51) Int. Cl.
 *H04L 45/28* (2022.01)
 *H04L 45/24* (2022.01)
 *H04L 45/50* (2022.01)
 *H04L 43/0817* (2022.01)
 *H04L 45/00* (2022.01)

(52) U.S. Cl.
 CPC ............ *H04L 45/245* (2013.01); *H04L 45/28* (2013.01); *H04L 45/50* (2013.01); *H04L 45/66* (2013.01)

(58) Field of Classification Search
 USPC .......................................................... 709/238
 See application file for complete search history.

(56) References Cited

U.S. PATENT DOCUMENTS

| | | | |
|---|---|---|---|
| 8,259,563 | B1 | 9/2012 | Kothari et al. |
| 8,339,959 | B1 | 12/2012 | Moisand et al. |
| 8,630,189 | B2* | 1/2014 | Wang ...................... H04L 41/12 370/248 |
| 8,665,711 | B2 | 3/2014 | Kothari et al. |
| 8,750,288 | B2 | 6/2014 | Nakil et al. |
| 9,019,814 | B1 | 4/2015 | Mohanty et al. |
| 9,019,962 | B1 | 4/2015 | Ghosh |
| 9,065,758 | B2 | 6/2015 | Zhang et al. |
| 9,137,147 | B2 | 9/2015 | Zhang et al. |
| 9,178,796 | B2 | 11/2015 | Previdi et al. |
| 9,450,817 | B1 | 9/2016 | Bahadur et al. |
| 9,634,925 | B2 | 4/2017 | Racz et al. |
| 9,678,840 | B2* | 6/2017 | Zhou ....................... H04L 45/22 |
| 9,794,165 | B1 | 10/2017 | Wood |
| 10,693,679 | B2* | 6/2020 | Lin ..................... H04L 12/4633 |
| 2005/0232146 | A1 | 10/2005 | Lee et al. |
| 2006/0036892 | A1 | 2/2006 | Sunna |
| 2006/0050628 | A1* | 3/2006 | Ng ......................... H04W 60/005 370/216 |
| 2007/0189265 | A1* | 8/2007 | Li ............................. H04L 45/22 370/351 |
| 2009/0257346 | A1* | 10/2009 | Ng ............................ H04L 69/40 370/217 |
| 2011/0063985 | A1* | 3/2011 | Wang ...................... H04L 41/12 370/248 |
| 2011/0064086 | A1 | 3/2011 | Xiong et al. |
| 2012/0300620 | A1 | 11/2012 | Kothari et al. |
| 2014/0301186 | A1 | 10/2014 | Zhang et al. |
| 2014/0313886 | A1 | 10/2014 | Yuan et al. |
| 2015/0003283 | A1 | 1/2015 | Previdi et al. |
| 2015/0006757 | A1 | 1/2015 | Boutros et al. |
| 2015/0180766 | A1 | 6/2015 | Racz et al. |
| 2015/0309894 | A1* | 10/2015 | Zhou ................... G06F 11/2023 714/4.11 |
| 2016/0050160 | A1 | 2/2016 | Li et al. |
| 2016/0191380 | A1 | 6/2016 | De et al. |
| 2016/0226701 | A1* | 8/2016 | Luo ......................... H04L 41/12 |
| 2017/0012895 | A1 | 1/2017 | Zhao et al. |
| 2017/0093611 | A1 | 3/2017 | Arora et al. |
| 2018/0102919 | A1 | 4/2018 | Hao et al. |
| 2018/0109400 | A1 | 4/2018 | Brissette et al. |
| 2019/0045562 | A1 | 2/2019 | Liu et al. |

FOREIGN PATENT DOCUMENTS

| | | |
|---|---|---|
| EP | 3151485 A1 | 4/2017 |
| EP | 3264690 A1 | 1/2018 |
| WO | 2013184846 A1 | 12/2013 |

OTHER PUBLICATIONS

"Configuring a Pseudowire Subscriber Logical Interface Device," Tech Library, Junos OS, Broadband Subscriber Access Protocols Feature Guide, accessed from https://www.juniper.net/documentation/en_US/junos/topics/task/configuration/pseudowire-interface-device-configuring.html, Sep. 13, 2017, 3 pp.

"Ethernet Services Using BGP MPLS Based Ethernet VPNs (EVPN)," ITU-T Draft, Issue: 2, Sep. 1, 2017, 65 pp.

"Junos® OS Layer 3 VPNs Feature Guide for Routing Devices," Juniper Networks, Inc., https://www.juniper.net/documentation/en_US/junos/information-products/pathway-pages/config-guide-vpns/config-guide-vpns-layer-3.pdf, Mar. 20, 2018, 384 pp.

"Junos® OS Tunnel and Encryption Services Interfaces Feature Guide for Routing Devices," Juniper Networks, Inc., https://www.juniper.net/documentation/en_US/junos/information-products/pathway-pages/services-interfaces/encryption-properties.pdf, modified Feb. 23, 2018, 212 pp.

"MAC Address Validation Overview," Tech Library, JunosE Software, Juniper Networks, Inc., accessed from https://www.juniper.net/documentation/en_US/junose13.2/topics/concept/ip-mac-address-validate-overview.html, Jun. 20, 2012, 1 pp.

"Understanding Junos Fusion Ports," Tech Library, Junos OS, Junos Fusion Data Center Feature Guide, Juniper Networks, Inc., accessed from https://www.juniper.net/documentation/en_US/junos/topics/concept/fusion-ports.html, Feb. 26, 2018, 4 pp.

Awduche, "RSVP-TE: Extensions to RSVP for LSP Tunnels", Network Working Group, Request for Comments 3209, Dec. 2001, 62 pp.

Braden, "Resource ReSerVation Protocol (RSVP)," Network Working Group, Request for Comments 2205, Sep. 1997, 112 pp.

Chen et al. "PCE-initiated IP Tunnel, draft-chen-pce-pce-initiated-ip-tunnel-00", Network Working Group, Internet-Draft, Sep. 4, 2015, 23 pp.

Crabbe et al. "PCEP Extensions for PCE-initiated LSP Setup in a Stateful PCE Model, draft-crabbe-pce-pce-iniated-sp-00", Network Working Group, Internet-Draft, Oct. 9, 2012, 14 pp.

Crabbe et al., "Path Computation Element Communication Protocol (PCEP) Extensions for Stateful PCE," Internet Engineering Task Force, Request for Comments 8231, Sep. 2017, 58 pp.

Page from "Release Notes: Junos® OS Release 17.4R1 for the ACX Series, EX Series, MX Series, NFX Series, PTX Series, QFX Series, SRX Series, and Junos Fusion," Juniper Networks, Inc., https://www.juniper.net/documentation/en_US/junos/information-products/topic-collections/release-notes/17.4/junos-release-notes-17.4.pdf, May 17, 2018.

Paul "PCEP extension to support reporting of dynamic tunnels, draft-paul-pce-dynamic-tunnel-00" PCE, Internet-Draft, Nov. 20, 2018, 8 pp.

Rosen, "BGP/MPLS IP Virtual Private Networks (VPNs)," Network Working Group, RFC 4364, Feb. 2006, 48 pp.

Sajassi et al., "A Network Virtualization Overlay Solution using EVPN," draft-ietf-bess-evpn-overlay-07, Internet Draft, Dec. 1, 2016, 28 pp.

Sethuraman, "Contrail Cloud Solution With MPLS-Over-UDP Overlays," Blog, https://tungstenfabric.io/contrail-cloud-solution-with-mpls-over-udp-overlays/, Jan. 4, 2017, 19 pp.

Vasseur "Path Computation Element (PCE) Communication Protocol (PCEP)," Network Working Group, Request for Comment 5440, Mar. 2009, 88 pp.

(56) References Cited

OTHER PUBLICATIONS

Worster, "Encapsulating MPLS in IP or Generic Routing Encapsulation (GRE)," Network Working Group, RFC 4023, Mar. 2005, 14 pp.
Xu, "Encapsulating MPLS in UDP," Internet Engineering Task Force (IETF), RFC 7510, Apr. 2015, 20 pp.
Extended Search Report from counterpart European Application No. 19180808.8, dated Dec. 2, 2019, 13 pp.
Response to Extended Search Report dated Dec. 2, 2019, from counterpart European Application No. 19180808.8, filed Jul. 1, 2020, 19 pp.
Prosecution History from U.S. Appl. No. 16/127,101, dated Feb. 20, 2020 through Mar. 26, 2020, 10 pp.
Examination Report from counterpart European Application No. 19180808.8 dated Oct. 19, 2021, 4 pp.
Response to Communication pursuant to Article 94(3) EPC dated Oct. 19, 2021, from counterpart European Application No. 19180808.8 filed Feb. 11, 2022, 8 pp.

\* cited by examiner

USING MULTIPLE ETHERNET VIRTUAL PRIVATE NETWORK (EVPN) ROUTES FOR CORRESPONDING SERVICE INTERFACES OF A SUBSCRIBER INTERFACE

This application is a continuation of U.S. application Ser. No. 16/127,101, which was filed on Sep. 10, 2018 and which claims the benefit of Indian Provisional Patent Application No. 201841023551, which was filed on Jun. 25, 2018. The entire content of each of application Ser. No. 16/127,101 and 201841023551 is incorporated herein by reference.

TECHNICAL FIELD

The disclosure relates to packet-based computer networks and, more particularly, to forwarding packets within computer networks.

BACKGROUND

A network service provider offers services to subscribers that access a service provider core network using an access network. Services offered may include, for example, traditional Internet access, Voice-over-Internet Protocol (VoIP), video and multimedia services, and security services. The service provider network may support multiple types of access network infrastructures that connect to service provider network access gateways to provide access to the offered services.

Because the access gateways are positioned near the edge of the service provider network directly upstream from the subscribers and operate to provide an operational endpoint (i.e., terminate) the subscriber connections (e.g., digital subscriber line- or cable-based connections) into the service provider network, the access gateways typically provide mechanisms for identifying subscriber traffic and providing subscriber-specific services. The access gateways apply subscriber policies to manage subscriber traffic on a per-subscriber basis as such traffic traverses the service provider core network boundary.

Network devices, such as access gateways, often include a control unit (e.g., one or more programmable processors and/or circuitry) that provides control plane functionality for the network device. In some cases, the network devices may also include a plurality of forwarding components, such as packet forwarding engines (PFEs), and an internal switch fabric that collectively provide a forwarding plane for forwarding network traffic.

Service providers may use Metro Ethernet to provide Layer 2 Ethernet connections between customer sites in metro area networks. Driven by its relative simplicity, high bandwidth, and low-cost switches, Ethernet has become the transport technology of choice in metro area networks.

SUMMARY

In general, this disclosure describes techniques for using multiple Ethernet Virtual Private Network (EVPN) routes for corresponding service interfaces configured for a subscriber interface. For example, a multi-service subscriber interface, such as a pseudowire subscriber (PS) interface, may multiplex, via EVPN Flexible Cross Service (FXC), multiple VLAN-based services over a single transport interface that terminates a service tunnel, such as a pseudowire or more specifically a virtual private wire service layer 2 VPN (VPWS). An EVPN-VPWS provides a framework for delivering VPWS with EVPN signaling mechanisms. Customer edge (CE) devices accessing different VLAN-based services may each be multihomed to multiple network devices, each serving as an endpoint for a respective service tunnel. Network devices that are endpoints for a service tunnel can multiplex, using service interfaces configured for a single transport interface for the service tunnel, multiple services for delivery by the service tunnel. As described herein, a network device that is a service tunnel endpoint advertises respective EVPN routes for the multiple service interfaces to indicate, to the other service tunnel endpoint, reachability for each of the service interfaces at the network device.

The techniques may provide one or more technical advantages. As one example, the techniques may facilitate service-based failure handling to reduce packet forwarding to failed interfaces via the service tunnel and support tracking such failures on per-subscriber, per-customer, or per-service basis. Having advertised respective EVPN routes for the multiple service interfaces, a network access device that detects a failure of one of the service interfaces can gracefully signal the failure by withdrawing the EVPN route for the failed service interface. The network aggregation device (i.e., the other service tunnel endpoint) that receives the EVPN route withdrawal from the network access device may thereafter eschew forwarding corresponding service traffic for the failed service interface on the service tunnel to the network access device. Thus, the techniques of the disclosure may avoid sending network traffic across the service tunnel that the network access device is unable to forward, thereby reducing network congestion on the service tunnel. Further, the techniques of the disclosure may support redundancy of network access devices. For example, instead of dropping traffic to be forwarded to the failed service interface, the network aggregation device that receives an EVPN route withdrawal from a first network access device may instead redirect such traffic to a second, different network access device that has a functioning service interface. Further, the techniques of the disclosure may allow a plurality of customer edge (CE) devices to be multihomed to the same set of network access devices while still using a single service tunnel between each of the network access devices and a network aggregation device for different VLANs, subscribers, and/or services. Further, the techniques of the disclosure may allow the use of a single service tunnel between a network access device and a network aggregation device for both single-homed and multihomed CE devices.

In one example, this disclosure describes a method comprising: signaling, by a first network device, to a second network device, and using Ethernet Virtual Private Network (EVPN) route advertisements, a multi-service service tunnel to transport network packets for a plurality of services, wherein the first network device is configured with a single transport interface for the service tunnel, the single transport interface configured with a plurality of service interfaces for the plurality of services; detecting, by the first network device, failure of a failed service interface of the plurality of service interfaces; and outputting, by the first network device and to the second network device in response to the failure, an EVPN route withdrawal message for the service tunnel that identifies a service of the plurality of services that corresponds to the failed service interface of the plurality of service interfaces configured for the single transport interface for the service tunnel.

In another example, this disclosure describes a method comprising: signaling, by a first network device, to a second network device, and using Ethernet Virtual Private Network (EVPN) route advertisements, a multi-service service tunnel to transport network packets for a plurality of services, wherein the first network device is configured with a single transport interface for the service tunnel, the single transport interface configured with a plurality of service interfaces for the plurality of services; in response to receiving an EVPN route withdrawal message for the service tunnel that identifies a service of the plurality of services that corresponds to a failed service interface of the plurality of service interfaces configured for the single transport interface for the service tunnel, updating, by the first network device, a route for the service identified in the EVPN route withdrawal message; and forwarding network packets for the plurality of services in accordance with the updated route.

In another example, this disclosure describes a first network device configured to: signal, to a second network device and using Ethernet Virtual Private Network (EVPN) route advertisements, a multi-service service tunnel to transport network packets for a plurality of services, wherein the first network device is configured with a single transport interface for the service tunnel, the single transport interface configured with a plurality of service interfaces for the plurality of services; detect failure of a failed service interface of the plurality of service interfaces; and output, to the second network device in response to the failure, an EVPN route withdrawal message for the service tunnel that identifies a service of the plurality of services that corresponds to the failed service interface of the plurality of service interfaces configured for the single transport interface for the service tunnel.

In another example, this disclosure describes a first network device configured to: signal, to a second network device and using Ethernet Virtual Private Network (EVPN) route advertisements, a multi-service service tunnel to transport network packets for a plurality of services, wherein the first network device is configured with a single transport interface for the service tunnel, the single transport interface configured with a plurality of service interfaces for the plurality of services; in response to receiving an EVPN route withdrawal message for the service tunnel that identifies a service of the plurality of services that corresponds to a failed service interface of the plurality of service interfaces configured for the single transport interface for the service tunnel, update a route for the service identified in the EVPN route withdrawal message; and forward network packets for the plurality of services in accordance with the updated route.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference characters refer to like elements throughout the figures and description.

DETAILED DESCRIPTION

In accordance with the techniques of the disclosure, a network device of an Ethernet Virtual Private Network (EVPN) Virtual Private Wire Service (VPWS) network, that detects a failure of a service interface may gracefully signal the failure by withdrawing the EVPN route for the failed service interface. For example, a first network device uses EVPN route advertisements to signal, with a second network device, a multi-service service tunnel to transport network packets for a plurality of services. The first network device is configured with a single transport interface for the service tunnel and the single transport interface is configured with a plurality of service interfaces for the plurality of services. Having advertised respective EVPN routes for the multiple service interfaces to the second network device, the first network device detects failure of a failed service interface of the service interfaces. In response to the detected failure, the first network device outputs an EVPN route withdrawal message for the service tunnel that identifies the service corresponding to the failed service interface. The second network device (i.e., the other service tunnel endpoint) that receives the EVPN route withdrawal may thereafter eschew forwarding corresponding service traffic for the failed service interface on the service tunnel. For example, the second network device may drop traffic to be forwarded to the failed service interface. Alternatively, instead of dropping the traffic to be forwarded to the failed service interface, the second network device may instead redirect such traffic to a different network device that has a functioning service interface for the service.

Thus, the techniques of the disclosure may facilitate service-based failure handling to reduce packet forwarding to failed interfaces via the service tunnel and support tracking such failures on per-subscriber, per-customer, or per-service basis. Further, a system in accordance with the techniques of the disclosure may avoid sending across the service tunnel network traffic that the network access device is unable to forward, thereby reducing network congestion on the service tunnel. Additionally, the techniques of the disclosure may support redundancy of network access devices.

Figure 1:
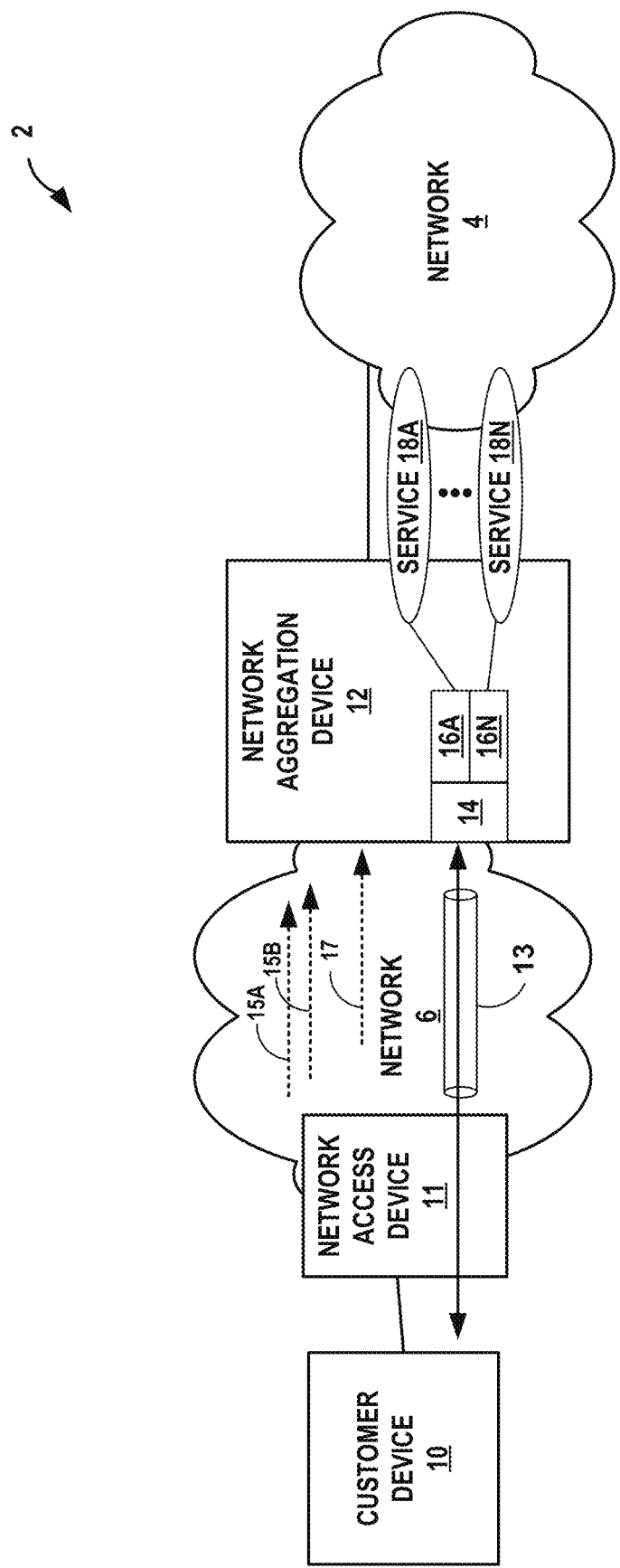
FIG. 1 is a block diagram illustrating an example network system in accordance with the techniques of the disclosure.

FIG. 1 is a block diagram illustrating an example network system 2 in accordance with the techniques of the disclosure. In the example of FIG. 1, network aggregation device 12 operates as a layer 3 access gateway for network 6 to network 4. In this example, network 6 may be referred to as an access network in that customer device 10 uses network 6 to access services provided by network system 2. Network 6 includes network access device 11 which acts as an access gateway to provide connectivity between network 6 and customer device 10. Network 4 may be referred to as a core network that offers layer 3 routing and forwarding services for access to one or more other networks, such as the Internet. Network aggregation device 12 may be configured with one or more layer 3 virtual private networks that operate over network 4. Customer device 10 attaches to (i.e., communicates within) network system 2 via access network 6 to access services or devices provided within network 4.

Network system 2 may represent a service provider network such as that provided by an Internet Service Provider or Network Service Provider (ISP/NSP). Each of network access device 11 and network aggregation device 12 may be examples of Provider Edge (PE) routers that provide an interface between customer device 10 and network 4.

Customer device 10 may be, for example, a mobile phone, a smart phone, a desktop/laptop computer, a gaming console, a video-conferencing suite, a workstation, a wireless device, a network-ready appliance, a file server, print server, a digital subscriber line (DSL) router, a cable modem, or another device with which to access services of network system 2. Customer device 10 may be associated with a subscriber, such as an enterprise, a residential subscriber, or a mobile subscriber to an operator of network system 2. Customer device 10 connects to network 6 via one or more access links that may each comprise wired and/or wireless communication links. The term "communication link," as used herein, comprises any form of transport medium, wired or wireless, and can include intermediate nodes such as network devices. An access link may include, for instance, aspects of an asymmetric Digital Subscriber Line (DSL) network, cable network, a radio access network for a cellular access network, WiMAX, a T-1 line, an Integrated Service Digital Network (ISDN), or wired Ethernet.

Network 6 may aggregate data traffic from one or more devices for transport to/from network 4 of network system 2. Network 6 includes network access device 11 that executes communication protocols to transport control and user data to facilitate communication between customer device 10 and network 4. Network 6 may comprise, for example, digital subscriber line access multiplexers (DSLAMs), Ethernet aggregation devices (EADs) switches, edge routers, broadband remote access servers (BRAS), a gateway general packet radio service (GPRS) support node (GGSN) and other GPRS support node (GSNs), a Universal Mobile Telephone System (UMTS) having a UMTS Terrestrial Radio Access Network (UTRAN), and/or a 3GPP Long Term Evolution (LTE) mobile access network employing, for instance, service gateways (SGWs), packet data network gateways (PDNs), and eNodeBs, a mobile IP network, an IP network, or another type of network that provides access for customer device 10 to network 4. The elements of network 6 may support a variety of protocols, such as Internet Protocol (IP), Multiprotocol Label Switching (MPLS), Frame Relay, Asynchronous Transfer Mode (ATM), Ethernet, Point-to-Point Protocol (PPP), Point-to-Point Protocol over Ethernet (PPPoE), GPRS tunneling protocol (GTP), and virtual local area network (VLAN)-related protocols, among others. Customer device 10 may have a dedicated subscriber interface, e.g., an ATM virtual circuit (VC) or an Ethernet VLAN, to access network 6.

Network 4 may represent a public network that is owned and operated by a service provider to interconnect a plurality of networks, such as network 6. Network 4 may implement Multi-Protocol Label Switching (MPLS) forwarding and in such instances may be referred to as an MPLS network. In some instances, network 4 represents a plurality of interconnected autonomous systems, such as the Internet, that offers services from one or more service providers.

In some instances, transport links couple network aggregation device 12 to network 6 and network 4. Network aggregation device 12 may be considered as located "behind" the network 6. Network aggregation device 12 may constitute a part of a backhaul network, which may include land-based transmission lines, frequently leased by a service provider, to transport data and control traffic between network 6 and network 4. The backhaul network typically also includes switches, aggregation devices, and routers. Network aggregation device 12 may represent a network edge or core router that routes network packets to/from network 6, or network aggregation device 12 may comprise an intermediate network device that transports packets between network 6 and network 4. In some embodiments, network aggregation device 12 comprises an MX-series router manufactured by Juniper Networks, Inc., of Sunnyvale, Calif. Various embodiments of network system 2 may include additional network aggregation devices.

Network aggregation device 12 may also represent an access gateway in some instances, i.e., a layer 3 network edge device that manages subscriber sessions and routes data traffic to/from network 4. In such instances, network aggregation device 12 authenticates or receives authentication for customer device 10, authorizes the customer device 10 to access network 4, and may provide network configuration information to customer device 10. When customer device 10 attempts to attach to network system 2, network aggregation device 12 may authenticate the device by interfacing to a server using an AAA protocol, such as Remote Authentication Dial-In User Service (RADIUS) or the Diameter protocol, to authenticate the subscriber device or a user thereof. Network aggregation device 12 in such instances may comprise, for example, a GGSN, an edge router such as a BRAS, a CMTS, or another network device.

A network service provider that administers network system 2 may offer services on a per-subscriber basis to instances of customer device 10 that access the service provider network. Services offered may include, for example, traditional Internet access, Voice-over-Internet Protocol (VoIP), video and multimedia services, and security services. The network service provider may configure network system 2 to offer services to subscribers in accordance with one or more service level agreements (SLAs) that define network performance levels in a number of dimensions, including the type of offered services and corresponding service parameters (e.g., upstream/downstream bandwidth, reliability (e.g., up-time), security, quality of service, rate limits, and others). In this way, SLAs or other service agreements may govern communication between network system 2 and instances of customer device 10.

Customer device 10 may begin exchanging data packets with network 4, and such packets traverse network aggregation device 12 as members of at least one packet flow. The term "packet flow" refers to a set of packets originating from a particular source device and sent to a particular destination device as part of an application communication session between the source and destination device. A flow of packets, in either the upstream (sourced by customer device 10) or downstream (destined for customer device 10) direction, may be identified by the five-tuple: <source network address, destination network address, source port, destination port, protocol>. This five-tuple generally identifies a packet flow to which a received packet corresponds and, depending on the flow direction, a subscriber may be associated with either the source network address or the destination network address of the flow. In some instances, access network 6 may overload the five-tuple or a subset thereof with packet flows for multiple different subscribers and/or with multiple packet flows for the same subscriber. Packet flows may also be characterized and identified according to other characteristics, including VLAN tags, PPPoE session, and GTP tunnel identifiers of network layer or data link layer protocol headers/tags that encapsulate the packets. Network aggregation device 12 may identify an application using deep packet inspection (DPI).

In some examples, network system 2 is an EVPN VPWS. An Ethernet VPN (EVPN) connects dispersed customer sites using a Layer 2 virtual bridge. As compared with other types of Layer 2 VPNs, an EVPN consists of customer edge (CE) devices, such as hosts, routers, or switches (not depicted) connected to network access devices (e.g., network access device 11). The network access devices may include an MPLS edge switch (MES) that acts at the edge of the MPLS infrastructure. In another example, a standalone switch can be configured to act as the MES. Multiple EVPNs may be deployed within a service provider network, such as network system 2 of FIG. 1, each providing network connectivity to a customer while ensuring that the traffic sharing on that network remains private. An EVPN may define multiple types of routes, such as, e.g., Ethernet AD routes, MAC/IP advertisement routes, and Ethernet Segment routes. An example Ethernet AD route in accordance with the techniques of the disclosure is provided below in FIG. 5.

Virtual private wire service (VPWS) Layer 2 VPNs employ Layer 2 services over MPLS to build a topology of point-to-point connections that connect end customer sites in a VPN. The service provisioned with these Layer 2 VPNs is known as VPWS. A VPWS instance may be configured on each associated edge device for each VPWS Layer 2 VPN.

Network system 2 provides a framework for delivering VPWS with EVPN signaling mechanisms. The advantages of VPWS with EVPN mechanisms are single-active or all-active multihoming capabilities and support for Inter-autonomous system (AS) options associated with BGP-signaled VPNs. Metro Ethernet Forum (MEF) refers to two service models for VPWS. In the first service model, Ethernet private line (EPL) provides a point-to-point Ethernet virtual connection (EVC) between a pair of dedicated user-network interfaces (UNIs) that is between a pair of Ethernet segment identifiers (ESIs) with a high degree of transparency. In the second service model, Ethernet virtual private line (EVPL) provides point-to-point EVC between {ESI, VLAN} pairs. EVPL allows service multiplexing; that is multiple EVCs or Ethernet services per UNI.

Network system 2 is supported on an EVPN-MPLS network. Customer device 10 may be single-homed to a single network access device 11 of network 6 (as depicted in the example of FIG. 1) or multihomed to two or more network access devices 11 (as depicted below with respect to the example of FIG. 2).

An EVPN instance (EVI) is an EVPN routing and forwarding instance spanning across all network access devices participating in that VPN. Network access device 11 and network aggregation device 12 may use VPWS service identifiers to identify the endpoints of network system 2. For example, network access device 11 may use BGP to auto-discover an endpoint of network aggregation device 12, and vice versa. Upon discovery, network access device 11 and network aggregation device 12 exchange service labels (learned from one another) that are used by auto-discovered routes per EVI route type. The service identifier is of two types. The first type is a unique local VPWS service identifier. This is a logical identifier mapped to a physical interface of network access device 11 connected to the customer site that is forwarding the traffic to a remote VPWS service identifier. The second is a unique remote VPWS service identifier. This is a logical identifier mapped to a physical interface of network access device 11 connected to the customer site that is receiving the traffic forwarded from the local VPWS service identifier.

Network system 2 uses only an auto-discovered route per ESI and an auto-discovered route per EVI route types. In auto-discovered routes per EVI, the 24-bit values of the Ethernet tag are encoded with the VPWS service identifier. The auto-discovered route per ESI is encoded with the route targets of all the EVPN-VPWS instances connected to the ESI on the advertising network access device 11. If network access device 11 loses its connectivity to the ESI, it withdraws the auto-discovered route per ESI, resulting in faster convergence. Network aggregation device 12 updates the forwarding next hop of the VPWS service identifier impacted by the failure. Depending on the mode of operation, these two endpoints of the EVPN-VPWS network can be co-located on the same network device or on different network devices (e.g., network access device 11 and network aggregation device 12). The different modes of operation in an EVPN-VPWS network are set forth below:

Local switching. While in the local switching mode, the VPWS endpoints (that is, local and remote service identifiers) are connected through the local interfaces configured on the same network access device 11. Traffic from one CE router is forwarded to another CE router through network access device 11.

Single-homing. While in the single-homing mode of operation, a network access device 11 is connected to a single-homed customer site.

Active-standby multihoming. In active-standby multihoming mode, only a single network access device 11 among a group of network access devices with the same VPWS service identifier attached to an Ethernet segment is allowed to forward traffic to and from that Ethernet segment.

Active-active multihoming. In active-active multihoming mode, the customer device 10 is connected to the network access device 11 with the same local VPWS identifier through the LAG interface so that the traffic is load-balanced among the set of multihomed network access devices with the same remote VPWS service identifiers.

Nonstop active routing (NSR) and graceful Routing Engine switchover (GRES) may be used to minimize traffic loss when there is a Routing Engine switchover. When a Routing Engine fails, NSR and GRES enable a routing platform with redundant Routing Engines to switch over from a primary Routing Engine to a backup Routing Engine and continue forwarding packets.

Network aggregation device 12 sends and receives packets using physical network interface 14. Physical network interface 14 may represent a physical interface or port of a network interface card (NIC). Network aggregation device 12 is configured with one or more logical interfaces 16A-16N (collectively, "logical interfaces 16"). Logical interfaces 16 may be layer 2 logical interfaces. Each of logical interfaces 16 may use a different VLAN-ID as a virtual circuit identifier, and the scope of the VLAN-ID may be local to the physical network interface 14.

Logical interfaces 16 subdivide a physical unit (in this case physical network interface 14) into multiple logical units to provide flexible packet processing. Properties of the physical interface 14 are shared among logical interfaces 16. Each logical interface 16 has corresponding logical properties specific to that interface, such as protocol families running on the interface (including protocol-specific Maximum Transmission Units (MTUs)), IP address(es) associated with the interface, VLAN tags, and filters and/or routing policies operating on the interface.

In some examples, network aggregation device 12 is a network aggregation device for subscriber devices, e.g., customer device 10, and supports subscriber management. Subscriber management supports the creation of service interfaces for services 18A-18N (collectively, "services 18") over point-to-point MPLS pseudowires. In some examples, services 18 are a plurality of VLAN-based services that are provided to customer device 10 to transport customer traffic across core network 4. For example, services 18 may include transport services across the core MPLS cloud, such as Layer-3 Virtual Private Network (L3VPN), Virtual Private Local Area Network (LAN) Service (VPLS), Ethernet Virtual Private Network (EVPN), Virtual Switching Instance (VSI), Media Access Control Virtual Routing and Forwarding (MAC-VRF), Virutal Private Lan Routing Instance (VPLS-RI), and Layer-3 Internet Protocol Virtual Routing and Forwarding (L3-IP-VRF), or other types of transport services across the core MPLS cloud.

In accordance with the techniques of the disclosure, a network device of network system 2, that detects a failure of a service interface may gracefully signal the failure by withdrawing the EVPN route for the failed service interface. For example, network access device 11 uses EVPN route advertisements to signal, with network aggregation device 12, a multi-service service tunnel 13 to transport network packets for a plurality of services 18. Network access device 11 is configured with a single transport interface for service tunnel 13 and the single transport interface is configured with a plurality of service interfaces for the plurality of services 18. Having advertised respective EVPN routes for the multiple service interfaces to network aggregation device 12, network access device 11 detects failure of a failed service interface of the plurality of service interfaces. In response to the detected failure, network access device 11 outputs an EVPN route withdrawal message for the service tunnel that identifies the service corresponding to the failed service interface. Network aggregation device 12 receives the EVPN route withdrawal, and in response, may thereafter eschew forwarding corresponding service traffic for the failed service interface on service tunnel 13. For example, network aggregation device 12 may drop traffic to be forwarded to the failed service interface. Alternatively, instead of dropping the traffic to be forwarded to the failed service interface, network aggregation device 12 may instead redirect such traffic to a different network device (as described in more detail below with respect to FIG. 2) that has a functioning service interface for the service.

Thus, the techniques of the disclosure may facilitate service-based failure handling to reduce packet forwarding to failed interfaces via the service tunnel and support tracking such failures on per-subscriber, per-customer, or per-service basis. Further, a system in accordance with the techniques of the disclosure may avoid sending across service tunnel 13 network traffic that network access device 11 is unable to forward, thereby reducing network congestion on service tunnel 13. Additionally, the techniques of the disclosure may support redundancy of network access devices 11.

As a further example of network system 2, service tunnel 13 may comprise a pseudowire (PW) or a p2p E-LINE service (hereinafter, "PW service" or "E-LINE service") used to provide a logical interface for an Ethernet connection between two network devices, such as network access device 11 and network aggregation device 12. As described herein, the terms "access node" and "network access device" may be used interchangeably. Further, as described herein, the terms "service node," "aggregation service node," and "network aggregation device" may be used interchangeably. Network access device 11 and network aggregation device 12 may be examples of a PE router of network 6.

The pseudowire service interface capability enables service providers to extend an MPLS domain from the access-aggregation network 6 to the network 4 service edge, where subscriber management is performed. Service providers can take advantage of MPLS capabilities such as failover, rerouting, and uniform MPLS label provisioning, while using a single pseudowire to service a large number of DHCP and PPPoE subscribers in the service network. The pseudowire is a tunnel (e.g., tunnel 13) that is either an MPLS-based Layer 2 VPN or Layer 2 circuit. Pseudowire tunnel 13 transports Ethernet encapsulated traffic from network access device 11 (for example, a DSLAM or other aggregation device) to network aggregation device 12 (e.g., a router that hosts the subscriber management services). The termination of pseudowire tunnel 13 on network aggregation device 12 may be similar to a physical Ethernet termination, and is the point at which subscriber management functions are performed. A service provider can configure multiple pseudowires on a per-DSLAM basis and then provision support for a large number of subscribers on a specific pseudowire.

At an endpoint of the pseudowire terminated at network access device 11, the subscriber traffic can be groomed into the pseudowire in a variety of ways, limited only by the number and types of interfaces that can be stacked on the pseudowire. A configured anchor point identifies the logical tunnel (LT) interface that terminates the pseudowire tunnel at network access device 11, network aggregation device 12 in the example of FIG. 1.

The pseudowire is a virtual device that is stacked above the logical tunnel anchor point on the physical interface (the "IFD" (interface device)) and supports a circuit-oriented Layer 2 protocol (either Layer 2 VPN or Layer 2 circuit). The Layer 2 protocol provides the transport and service logical interfaces, and supports the protocol family (IPv4, IPv6, or PPPoE).

The pseudowire configuration is transparent to the subscriber management applications and has little or no impact on the packet payloads that are used for subscriber management. Subscriber applications such as Dynamic Host Configuration Protocol (DHCP) and Point-to-Point Protocol over Ethernet (PPPoE) can be stacked over Layer 2 similar to the way in which they are stacked over a physical interface.

In examples in which network aggregation device 12 provides access to network 4, as described above, logical interfaces 16 of physical network interface 14 may correspond to pseudowire service (PS) interfaces or logical tunnel (LT) interfaces. Logical interface 16 processing may include layer 3 routing on a network 4, which may include routing on a layer 3 VPN, for routable layer 3 packets having a layer 2 header having a destination MAC address that is a MAC address for the layer 3 routing interface for the logical interface 16.

On network aggregation device 12, through an IP interface or L2 Ethernet interface, traffic carried over an E-LINE service is terminated into a plurality of difference services 18 based on a VLAN identifier carried in the data packet. In some examples, a PS interface includes one logical transport interface and a plurality of logical service interfaces. When the PS interface is used to terminate an E-LINE service or a PW into individual services 18, only the logical transport interface of the PS is used as an access interface for the E-LINE service or a PW. The logical service interfaces of the PS belong to an L3-VRF (for L3VPN), a VPLS, or an EVPN into which the respective E-LINE service or PW terminates.

As described herein, PW or VPWS service tunnel 13 refers to an MPLS tunnel established between a pair of network devices or PE devices, such as network access device 11 and network aggregation device 12 in the example of FIG. 1, for the purpose of providing a point-to-point Ethernet connection between the pair of network devices. The terms PW service tunnel and VPWS service tunnel are used interchangeably. Typically, a data packet entering a service tunnel specifies at least two labels in the MPLS label stack: a service label and one or more transport labels. The service label is allocated downstream by a PE device (e.g., network access device 11). When an EVPN E-line is used to provide connectivity to a service, such as service 18A, network access device 11 advertises, to network aggregation device 12, a service label for service 18A through an EVPN Ethernet per-EVI AD route.

Using PS interfaces to terminate CE device traffic may have advantages over methods that use a pair of logical interfaces or logical tunnel interfaces. For example, a PS interface has a built-in capability to multiplex and de-multiplex subscribers, services, or customers over a single VPWS service tunnel based on one or more VLAN identifiers specified by a data packet. In other words, different subscribers or customers, each represented by a different VLAN identifier (Q-in-Q) in a corresponding data packet, may share the same VPWS service tunnel 13 allocated by network aggregation device 12.

For a data packet egressing from VPWS service tunnel 13 to network aggregation device 12, network aggregation device 12 de-encapsulates an MPLS header for the data packet based on a corresponding MPLS service label. Network aggregation device 12 forwards, to a logical transport interface of the PS, the de-encapsulated data packet. In some examples, a PS built-in VLAN demultiplexer demultiplexes the packet to a corresponding PS service IFL based on a VLAN identifier specified by the data packet. In some examples, VLAN de-multiplexing occurs after the traffic arrives at the PS logical transport IFL and after the PW or E-line service has terminated the PS logical transport IFL at a respective access interface.

For data packets originating from a logical service interface of the PS, the Ethernet packet carrying the VLAN identifier is sent to the PS logical transport IFL and encapsulated with a service label and an MPLS transport label(s) used by VPWS service tunnel 13.

As described herein, PW Headend Termination (PWHT) refers to a function realized by network aggregation device 12 that uses E-LINE service to carry traffic arrived at network access device 11 for different subscribers or customers to network aggregation device 12 and then terminating the traffic into different services 18 on network aggregation device 12 in a seamless MPLS network such as network 4.

As depicted in FIG. 1, physical interface 14 implements a PS interface for PWHT. EVPN VPWS is used to provide an Ethernet connection between network access device 11 and network aggregation device 12. Physical interface 14 serves as an access interface for EVPN VPWS tunnel 13, and logical interfaces 16 are used to terminate customer traffic for customer device 10 into different services 18 based on a VLAN identifier specified by each data packet of the customer traffic.

When the PS interface is used on network aggregation device 12 for PWHT, an EVPN based E-LINE service may support EVPN VPWS VLAN bundle services and EVPN FXC services on network access device 11 to bundle a set of access interfaces into the same group. The EVPN VPWS VLAN bundle service may be a port-based service that uses enterprise-style configuration. The EVPN VPWS VLAN bundle service allows multiple VLANs share the same physical interface, and uses only one local EVPN VPWS service instance ID. For example, network access device 11 and network aggregation device 12 may originate per-EVI Ethernet AD routes for the VLANs that are bundled together. It is of note that there may not be a one-to-one mapping between per-EVI Ethernet AD routes and specific VLANs. Thus, network access device 11 and network aggregation device 12 may use a single EVPN VPWS service tunnel 13 for the plurality of VLANs that provide connectivity to the plurality of services 18.

The EVPN FXC service bundles a set of access interfaces (e.g., logical interfaces 16) into the same group. This type of service uses a service provider-style of configuration. In some examples, network access device 11 may allow only one local service instance ID per group of access interfaces. In some examples, network access device 11 originates a single per-EVI Ethernet AD route for the group of access interfaces, while network aggregation device 12 originates a single per-EVI Ethernet AD route for the PS interface. Thus, network access device 11 and network aggregation device 12 may use a single EVPN VPWS service tunnel 13 for the set of logical interfaces 16.

For both EVPN VPWS VLAN bundle services and EVPN FXC services, each VLAN or VLANs (QinQ) may use the same VPWS service tunnel 13. However, only one per-EVI Ethernet AD route may be originated on network aggregation device 12 when the PS interface is used for PWHT. This is because only one PS logical transport interface terminates VPWS service tunnel 13, even though a PS interface is capable of VLAN multiplexing and de-multiplexing and a PS interface may have many logical service interfaces. For example, for network access device 11 to pair with network aggregation device 12, both network access device 11 and network aggregation device 12 may exchange a single per-EVI Ethernet AD route where the PS interface is used for PWHT. Thus, fault tracking on a per VLAN or VLANs (QinQ) basis using conventional systems is difficult because, if a link for a single VLAN fails, neither of network access device 11 and network aggregation device 12 may be able to determine which VLAN of a plurality of bundled VLANs is affected by the link failure.

In accordance with the techniques of the disclosure, each of network access device 11 and network aggregation device 12 may exchange control plane messages at configuration and startup that specify an outer label that uniquely identifies each respective device. The outer label serves as a "transport label" that uniquely identifies each of network access device 11 and network aggregation device 12 in an MPLS core. For instance, network access device 11 may send control plane messages 15A-15B (collectively, "control plane messages 15") that specify an outer label that identifies network access device 11 to network aggregation device 12. Network aggregation device 12 may configure a respective forwarding unit such that network packets that include the outer label corresponding to network access device 11 are forwarded to network access device 11.

In one example, network access device 11 may send a control plane message 15 to network aggregation device 12 that includes an MPLS label as shown above. Network aggregation device 12 may configure one or more of its forwarding units to apply the MPLS label of the Ethernet AD route from network access device 11 as the inner label in a label stack applied to network packets that are destined to network access device 11 for forwarding via the network identified by the Ethernet segment and Ethernet Tag ID. Network aggregation device 12 would then apply a transport label for reaching network access device 11 as the outer label in the label stack. In this way, the inner label provides EVPN-specification configuration information about the Ethernet AD route that network aggregation device 12 uses to forward network packets in the EVPN.

As one example, initially at startup, network access device 11 sends Ethernet AD route 15A to network aggregation device 12 to specify configuration information about an Ethernet AD route that network aggregation device 12 uses to forward network packets in the EVPN. As another example, during a subsequent configuration operation to update routes for network aggregation device 12, network access device 11 sends Ethernet AD route 15B to network aggregation device to specify configuration information about the Ethernet AD route that network aggregation device 12 uses to forward network packets in the EVPN.

In accordance with the techniques of the disclosure, network access device 11 sends Ethernet AD route 17 to network aggregation device 12 that includes an MPLS label as shown above to withdraw an Ethernet AD route that network aggregation device 12 previously indicated may be used to forward network packets in the EVPN. For example, in response to receiving Ethernet AD route 17, network aggregation device 12 configures one or more of its forwarding units to withdraw the MPLS label of the Ethernet AD route from network access device 11 as the inner label in a label stack applied to network packets that are destined to network access device 11 for forwarding via the network identified by the Ethernet segment and Ethernet Tag ID. Network aggregation device 12 would then apply a transport label for reaching network access device 11 as the outer label in the label stack. In this way, the inner label provides EVPN-specification configuration information about the Ethernet AD route that network aggregation device 12 uses to eschew forwarding network packets in the EVPN.

Additionally, network access device 11, network 6, and network aggregation device 12 support VLAN-based service with PS interfaces while still making use of the multiplex and de-multiplex feature of a PS interface over a single EVPN VPWS service tunnel (e.g., between network access device 11 and network aggregation device 12) for different VLANs. In one example, network 2 comprises an EVPN VPWS network with service interface-aware forwarding. In one example, network access device 11 is configured as a next hop for customer device 10. Network access device 11 determines that a link between customer device 10 and network access device 11 is disabled. In response to the determination, network access device 11 transmits, to network aggregation device 12 connected to network access device 11 via EVPN VPWS tunnel 13, a message withdrawing network access device 11 as a next hop for customer device 10 for a service that uses the failed link. In response to receiving the message, network aggregation device 12 withdraws, from a context table of next hops for a plurality of customer devices 10, network access device 11 as the next hop for customer device 10 for the service that uses the failed link. In some examples, upon withdrawing network access device 11 as the next hop, network aggregation device 12 may calculate a next hop for customer device 10 for the service that uses the failed link.

When EVPN Flexible Cross Service (FXC) is used on network access device 11 and in combination with a PS interface on network aggregation device 12, the techniques provide an end-to-end VLAN-based service with a single EVPN VPWS tunnel 13 and support tracking the failure on per subscriber or customer/service basis. If one of the VLAN interfaces suffers a failure, network access device 11 may signal the failure through the withdrawal, in the control plane, of a per EVI Ethernet AD route that network access device 11 originated that corresponds to the failed VLAN interface.

Thus, if a link between customer device 10 and network access device 11 suffers a failure, the techniques of the disclosure allow for network access device 11 to gracefully signal the failure by issuing a message that causes network aggregation device 12 to withdraw, from a RIB of network aggregation device 12, a per-EVI Ethernet AD route advertised by network access device 11 for customer device 10. Furthermore, after withdrawing the route, network aggregation device 12 updates a next-hop in a context table for a corresponding service so as to drop traffic to be forwarded to network access device 11 and destined for customer device 10 or to redirect such traffic to a different network access device. Thus, the techniques of the disclosure may avoid sending network traffic across EVPN VPWS tunnel 13 that network access device 11 is unable to forward, thereby reducing network congestion on EVPN VPWS tunnel 13.

Figure 2:
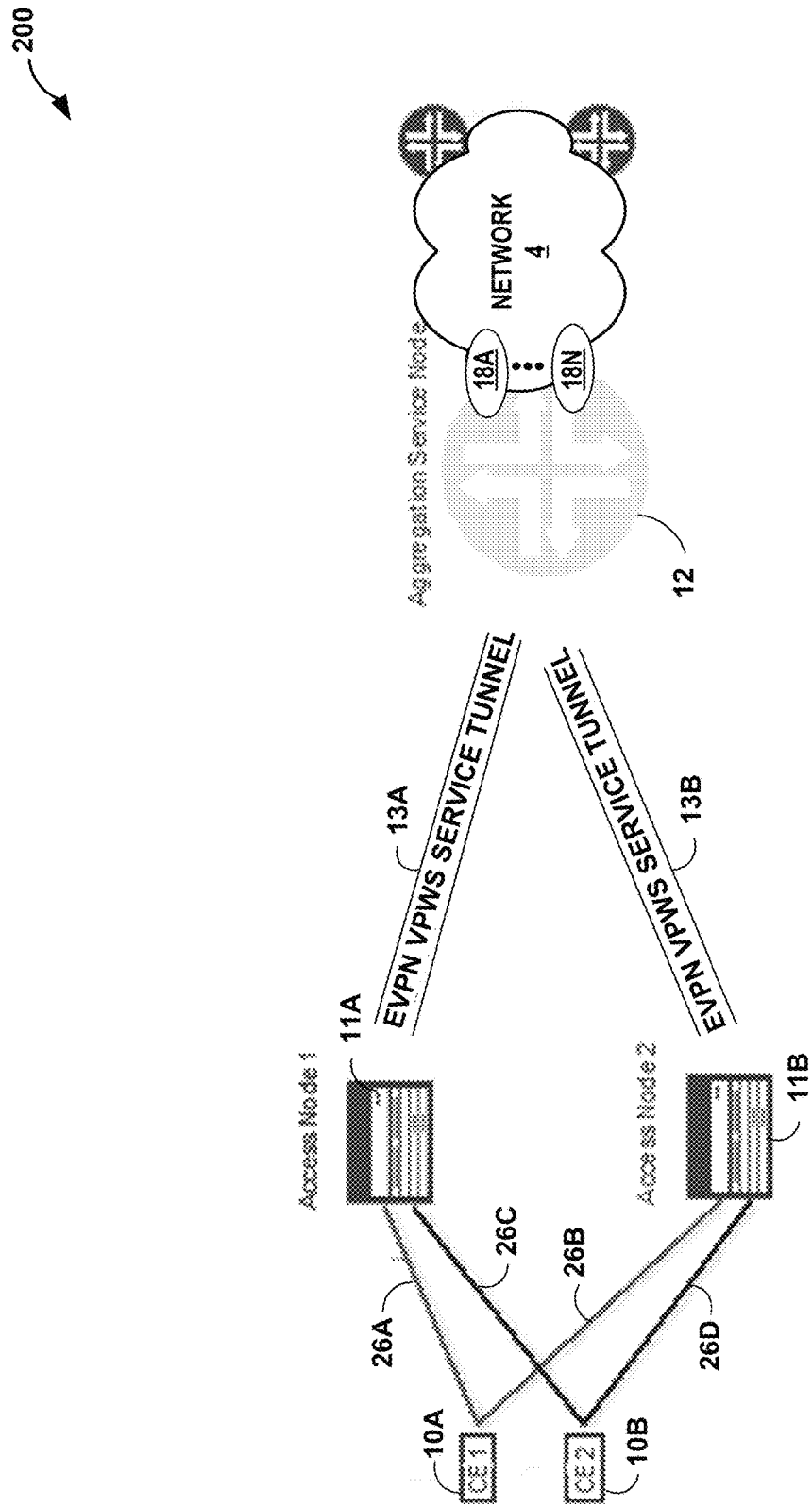
FIG. 2 is a block diagram illustrating another example network system in accordance with the techniques of the disclosure.

FIG. 2 is a block diagram illustrating another example network system 200 in accordance with the techniques of the disclosure. In some examples, network system 2 is an EVPN VPWS. Network system 200 includes a first customer device 10A and a second customer device 10B (collectively, "customer devices 10"), network access device 11A connected to network aggregation device 12 via EVPN VPWS service tunnel 13A, and network access device 11B connected to network aggregation device 12 via EVPN VPWS service tunnel 13B. Network aggregation device 12, network access device 11A, network access device 11B, and customer devices 10 may act in a substantially similar fashion to network aggregation device 12, network access device 11, and customer device 10 of FIG. 1. For example, network aggregation device 12, network access device 11A, network access device 11B act as PE devices to provide, to customer devices 10, connectivity to services 18 provided by MPLS core network 4. In the example of FIG. 2, customer device 10A is multihomed to network access devices 11A and 11B via links 26A and 26B, respectively. Further, customer device 10B is multihomed to network access devices 11A and 11B via links 26C and 26D, respectively.

From network aggregation device 12, two VPWS service tunnels are established: EVPN VPWS service tunnel 13A and EVPN VPWS service tunnel 13B, to reach network access device 11A and network access device 11B respectively. Traffic originating from any PS logical service interface for services 18 is sent to the PS logical transport interface of network aggregation device 12. Typically, network aggregation device 12 load balances the traffic between service tunnels 13A and 13B to reach a respective network access device 11A, 11B. Network aggregation device 12 stores, in a context table, an ECMP next-hop for each of services 18. For example, network aggregation device 12 installs a route with a prefix as follows:

PS logical transport IFL→ECMP next-hop

Depending on the multihoming mode of redundancy, one link 26A, 26B between, e.g., customer device 10A and network devices 11 may be active at any one time, or all links 26A, 26B can be active. When customer device 10A is multihomed to two or more network devices (e.g., 11A and 11B), the set of Ethernet links 26A, 26B constitutes an Ethernet segment. An Ethernet segment appears as a link aggregation group (LAG) to customer device 10A.

An EVPN instance (EVI) is an EVPN routing and forwarding instance spanning across all network access devices 11 participating in that VPN. An EVI is configured on the network access devices 11 on a per-customer basis. Each EVI has a unique route distinguisher and one or more route targets. An Ethernet tag identifies a particular broadcast domain, such as a VLAN. For EVPN VPWS, the Ethernet tag identifies an attachment circuit for an E-LINE service. In some examples, the Ethernet tag may be set to a normalized VLAN that corresponds to the E-LINE service. An EVI consists of one or more broadcast domains. Ethernet tags are assigned to the broadcast domains of a given EVI by the provider of that EVPN. Each network access device 11 in that EVI performs a mapping between broadcast domain identifiers understood by each of its attached customer devices 10A, 10B and the corresponding Ethernet tag.

The multihoming mode of operation along with VPWS service identifiers determine which network access devices 11 forward and receive traffic in network system 2. The VPWS service identifier identifies the endpoints of network system 2. For example, network access device 11A may use BGP to auto-discover an endpoint of network aggregation device 12, and vice versa. Upon discovery, network access device 11A and network aggregation device 12 exchange service labels (learned from one another) that are used by auto-discovered routes per EVI route type. The service identifier is of two types. The first type is a unique local VPWS service identifier. This is a logical identifier mapped to a physical interface of network access device 11A connected to customer device 10A that is forwarding the traffic to a remote VPWS service identifier. The second is a unique remote VPWS service identifier. This is a logical identifier mapped to a physical interface of network access device 11A connected to customer device 10A that is receiving the traffic forwarded from the local VPWS service identifier.

Only one network access device 11A, 11B connected to the Ethernet segment with the same VPWS service identifier forwards traffic to each customer device 10A, 10B. The one of network access devices 11 that forwards traffic to a customer device 10 is referred to as the designated forwarder (DF). The DF forwards traffic to customer device 10 using an MPLS LSP. If a failure occurs over this path, a new designated forwarder (e.g., network access device 10B) is elected to forward the traffic to customer devices 10. The process of electing one among many network access devices 11 with the same VPWS service identifier is known as the designated forwarder (DF) election. Each of network access devices 11 connected to the Ethernet segment with the same VPWS service identifier participates in the DF election and informs the network of its status. Each of network access devices 11 connected to the Ethernet segment with the same VPWS service identifier may have one of the following statuses:

Designated forwarder (DF). This network access device is the DF for forwarding the current traffic for the network access devices 11 with the same VPWS service identifier.

Backup designated forwarder (BDF). This network access device is assigned to become the DF in case the current DF encounters a failure.

Non-designated forwarder (non-DF). This network access device is neither the DF nor the BDF. When more than two network access devices are part of an ESI redundancy group, then this network access device becomes a non-DF.

Note that if the network access devices 11 are operating in active-active multihoming, election of DF may not be required because all the network access devices 11 connected to the LAG interface participate in forwarding the traffic.

Conventional systems may have difficulty implementing a single EVPN VPWS service tunnel 13 between one of network access devices 11A, 11B and network aggregation device 12 where different, multihomed CE devices 10A, 10B share the same set of redundant network access devices 11A, 11B under the EVPN VPWS VLAN bundle services or EVPN FXC services. Moreover, conventional systems may have difficulty implementing a single-homed customer device 10 and a multihomed customer device 10 behind network access device 11 that share the same VPWS service tunnel 13.

For example, if a link between customer device 10A and network access device 11A fails, traffic originating from a PS logical service interface and destined for customer device 10A is forwarded to EVPN VPWS service tunnel 13A to network access device 11A, while traffic destined for customer device 10B may still be load balanced between service tunnels 13A and 13B to reach network access device 11B. Conversely, if a link between customer device 10B and network access device 11B fails, traffic destined for customer device 10B should be forwarded to EVPN VPWS service tunnel 13A to reach network access device 11A. The following algorithm illustrates a conventional traffic-forwarding scheme for customer devices 10:

For traffic destined to customer device 10A:
    PS logical transport IFL -> next-hop to EVPN VPWS service tunnel 13B / network access device 11B.
For traffic destined to customer device 10B:
    PS logical transport IFL -> ECMP next-hop.
    If the link between customer device 10B and network access device 11B fails, PS logical transport IFL -> next-hop to EVPN VPWS service tunnel 13A / network access device 11A Thus, conventional systems may be unable to forward traffic when the same PS logical transport IFL is used as the prefix for ECMP next-hop routes.

In accordance with the techniques of the disclosure, an EVPN VPWS VLAN-based service and an EVPN VLAN-signaled FXC service is used in combination with the system disclosed herein. Specifically, the techniques of the disclosure describe a solution to use the multiplex and de-multiplex features of PS interfaces to support a plurality of VLAN-based services while still a single EVPN VPWS service tunnel 13A between network aggregation device 12 and network access device 11A for the plurality of VLAN-based services. In one example, EVPN Flexible Cross Service (FXC) is used on network access device 11A in combination with a PS interface on network aggregation device 12 so as to provide an end-to-end VLAN-based service with a single EVPN VPWS tunnel 13A which supports tracking failures on a per-subscriber, a per-customer, or a per-service basis. For example, if a VLAN interface between customer device 10A and network access device 11A suffers a failure, network access device 11A may signal the failure by withdrawing a per-EVI Ethernet AD route in the control plane of network aggregation device 12. Further, the techniques of the disclosure allow for supporting redundancy of network access devices 11A, 11B and allowing different multihomed customer devices 10A, 10B to share the same set of network access devices 11A, 11B and still use one VPWS service tunnel between a network access device 11 and network aggregation device 12 for a plurality of different VLANs, subscribers, or services (e.g., service tunnel 13A between network access device 11A and network aggregation device 12 or service tunnel 13B between network access device 11B and network aggregation device 12). Further, the techniques of the disclosure may use only one of VPWS service tunnels 13A, 13B between a respective one of network access devices 11A, 11B and network aggregation device 12 for both single-homed and multihomed customer devices 10A, 10B. In addition, the techniques of the disclosure may allow one of network access devices 11A, 11B to advertise one per-EVI Ethernet AD Route per VLAN or per VLAN stack.

For example, when a PS interface is used for the PWHT (e.g., such as between network access device 11A and network aggregation device 12), only the logical transport interface of the PS is used as an access interface for EVPN VPWS service tunnel 13A or the PW. Different VLANs are used as service delimiters to separate different subscribers, customer traffic, or services and each PS logical service interface is configured with a different VLAN. This model still applies even when a PS interface is used to support a VLAN-based service.

To support the tracking of a failure on a per-subscriber or per-service basis, network access node 11A, for example, advertises a per-EVI Ethernet AD route per PS logical service interface instead of per PS logical transport interface. Furthermore, network aggregation device 12 uses the same service label for each of the per-EVI Ethernet AD routes advertised for the PS logical service interfaces that belong to the same PS interface. This provides 1:1 mapping between the per-EVI Ethernet AD route and the PS logical service interface, while at the same time using a single service label for the PS interface.

When in combination of an EVPN FXC VLAN-signaled service at network access device 11A, the techniques of the disclosure may achieve failure tracking on a per-VLAN/VLAN stack (QinQ), a per-subscriber, or a per-service basis while still using one VPWS service tunnel 13 for different VLAN(s) or services. When an access interface or a PS logical service interface suffers a failure, a network device, such as one of network access devices 11A or 11B, may safely withdraw a corresponding per-EVI Ethernet AD route without impacting other services that share the same VPWS service tunnel 13.

To support network access device redundancy for different multihomed customer devices 10A, 10B that share the same set of network access devices 11A, 11B while still using only a single VPWS service tunnel 13 between a network access device 11 and network aggregation device 12 (e.g., service tunnel 13A between network access device 11A and network aggregation device 12 or service tunnel 13B between network access device 11B and network aggregation device 12), the techniques of the disclosure support 1-to-many relationships between a PS logical transport interface and different next-hops. In some examples, the PS logical transport interface may direct traffic received from the PS logical service interface to, e.g., network access device 11A. For traffic from network access device 11A to a service, such as service 18A, the built-in VLAN de-multiplex feature of the PS interface typically mitigates any issue of link failure detection on a per-subscriber, or a per-service. In other words, it is typically not necessary to use the VLAN de-multiplex feature for the E-LINE service itself. While one may implement such a feature, the system may lose the advantages that a PS interface provides to systems implementing PWHT.

Figure 3:
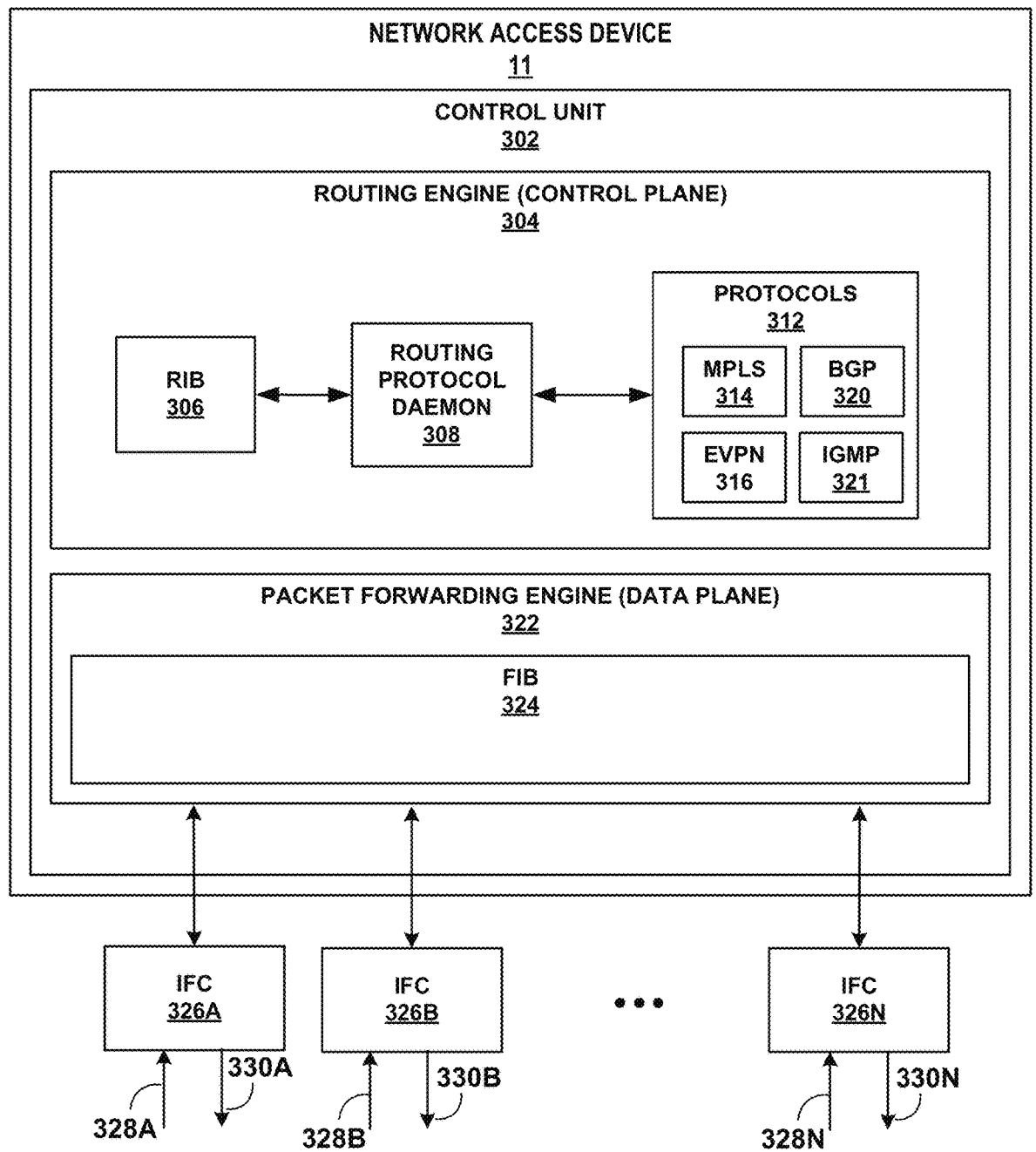
FIG. 3 is a block diagram illustrating, in further detail, an example instance of a network access device in accordance with the described techniques.

FIG. 3 is a block diagram illustrating, in further detail, an example instance of a network access device 11 in accordance with the described techniques. Network access device 11 may comprise a router such as a provider edge or customer edge router, or another type of network device, such as a switch. In some examples, network access device 11 is an example of network access device 11 of FIG. 1 or network access device 11A or 11B of FIG. 2.

In this example, network access device 11 includes interface cards 326A-326N ("IFCs 326") that receive packets via incoming links 328A-328N ("incoming links 228") and send packets via outbound links 330A-330N ("outbound links 330"). IFCs 326 are typically coupled to links 328, 330 via a number of interface ports. Network access device 11 also includes a control unit 302 that determines routes of received packets and forwards the packets accordingly via IFCs 326.

Control unit 302 may comprise a routing engine 304 and a packet forwarding engine 322. Routing engine 304 operates as the control plane for router 300 and includes an operating system that provides a multi-tasking operating environment for execution of a number of concurrent processes. Routing engine 304, for example, executes software instructions to implement one or more control plane networking protocols 312. For example, protocols 312 may include one or more routing protocols, such as BGP 320, for exchanging routing information with other routing devices and for updating routing information base (RIB) table 306, Multiprotocol Label Switching (MPLS) protocol 314, Ethernet Virtual Private Network (EVPN) 316, and Internet Group Management Protocol (IGMP) 321.

Routing Information Base (RIB) 306 may describe a topology of the network in which network access device 11 resides, and may also include routes through the shared trees in the computer network. RIB table 306 describes various routes within the network, and the appropriate next hops for each route, i.e., the neighboring routing devices along each of the routes. Routing engine 304 analyzes information stored in RIB 306 and generates forwarding information for forwarding engine 322, stored in Forwarding Information Base (FIB) 324. FIB 324 may associate, for example, network destinations with specific next hops and corresponding IFCs 326 and physical output ports for output links 330. FIB 324 may be a radix tree programmed into dedicated forwarding chips, a series of tables, a complex database, a link list, a radix tree, a database, a flat file, or various other data structures.

In accordance with the techniques of the disclosure, network access device 11 is configured as a next hop for traffic from service 18A (e.g., the first VLAN) of FIG. 1 and destined for customer device 10 of FIG. 1. Control unit 302 of network access device 11 receives, from network aggregation device 12 and via IFCs 326, network traffic originating from service 18A and destined for customer device 10 via EVPN VPWS tunnel 13. Subsequently, control unit 302 of network access device 11 may determine that a link between customer device 10 and network access device 11 is disabled. In response to determining that the link is disabled, control unit 302 of network access device 11 transmits, to network aggregation device 12 and via IFCs 326, a message withdrawing network access device 11 as a next hop for the traffic originating from service 18A and destined for customer device 10 (e.g., the E-line service that includes the failed link). In some examples, control unit 302 withdraws an EVPN per-EVI Ethernet AD route originated by network device 11 and corresponding to service 18A that specifies network access device 11 as a next hop for customer device 10.

Accordingly, if a link between customer device 10 and network access device 11 suffers a failure, the techniques of the disclosure allow for control unit 302 to gracefully signal the failure by causing network aggregation device 12 to withdraw, from a RIB of network aggregation device 12, a per-EVI Ethernet AD route advertised by network access device 11 for customer device 10. Thus, the techniques of the disclosure may avoid sending network traffic from service 18A across EVPN VPWS tunnel 13 that control unit 302 is unable to forward to customer device 10, thereby reducing network congestion on EVPN VPWS tunnel 13.

Figure 4:
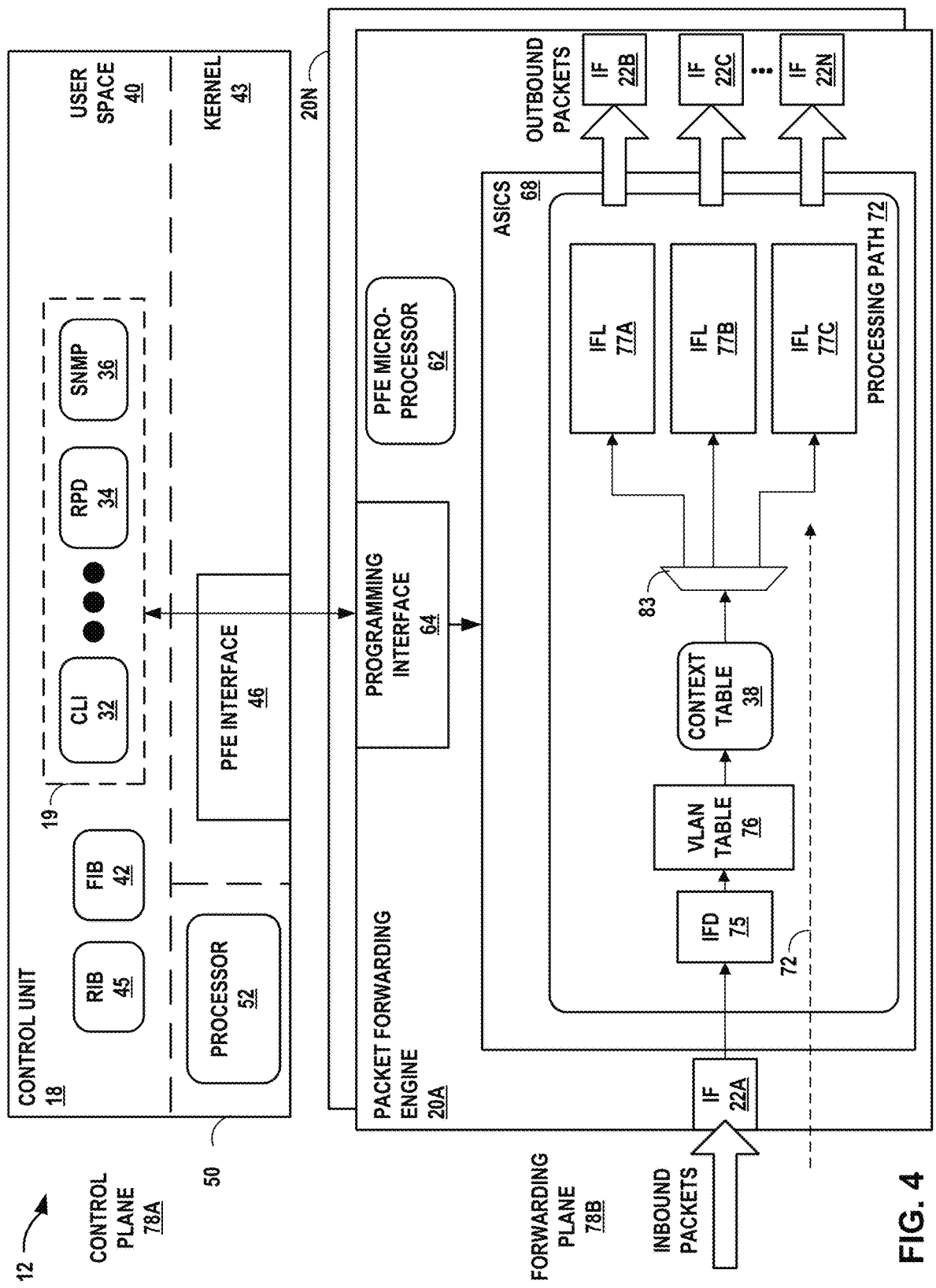
FIG. 4 is a block diagram illustrating, in further detail, an example instance of a network aggregation device in accordance with the described techniques.

FIG. 4 is a block diagram illustrating, in further detail, an example instance of network aggregation device 12 in accordance with the described techniques. In some examples, network aggregation device 12 may be configured to validate L2 network addresses (e.g., destination MAC addresses) for packets on a per-logical interface basis. Network aggregation device 12 may comprise a router such as a provider edge or customer edge router, or another type of network device, such as a switch. In some examples, network aggregation device 12 is an example of network aggregation device 12 of FIG. 1 or network aggregation device 12 of FIG. 2.

In this example, network aggregation device 12 includes a control unit 18 that provides control plane 78A functionality for the device. Control unit 18 may be distributed among multiple entities, such as one or more routing units and one or more service cards insertable into a chassis. In such instances, network aggregation device 12 may therefore have multiple control planes. Network aggregation device 12 also includes a plurality of forwarding components in the form of packet forwarding engines 20A-20N ("PFEs 20") and a switch fabric that together provide a forwarding plane 78B for forwarding and otherwise processing subscriber traffic. Other types of forwarding components may include packet processors, ASIC-based packet processors, or other specialized hardware that executes software for processing and forwarding packets. PFEs 20 receive and send data packets via physical interfaces 22A-22N of interface cards each associated with a respective one of PFEs 20. Each of PFEs 20 and its associated ones of IFCs 22 may reside on a separate line card for network aggregation device 12 (not shown). Example line cards include flexible programmable integrated circuit (PIC) concentrators (PFCs), dense port concentrators (DPCs), and modular port concentrators (MPCs). Each of interfaces 22 may support one of a variety layer two (L2) technologies, including Ethernet, Gigabit Ethernet (GigE), and Synchronous Optical Networking (SONET) interfaces. A switch fabric (not shown) provides a high-speed interconnect for forwarding incoming data packets to the selected one of PFEs 20 for output over a network.

Control unit 18 is connected to each of PFEs 20 by internal communication links. Internal communication links may comprise a 100 Mbps or 1 Gbps Ethernet connection, for instance. Daemons 19 executed by control unit 18 are user-level processes that run network management software, execute routing protocols to communicate with peer routing devices, execute configuration commands received from an administrator, maintain and update one or more routing tables, manage subscriber flow processing, and create one or more forwarding tables for installation to PFEs 20, among other functions. Daemons 19 in this example include command line interface (CLI) 32, routing protocol daemon (RPD) 34, and Simple Network Management Protocol (SNMP) daemon 36. In this respect, control plane 78A may provide routing plane, service plane, and management plane functionality for network aggregation device 12. Various instances of control unit 12 may include additional daemons 14 not shown in FIG. 4 that perform other control, management, or service plane functionality and/or drive and otherwise manage forwarding plane functionality for network aggregation device 12. Control unit 12 may in some instances represent a control unit of a service card or a combination of control units of a routing unit that provides routing plane functionality and a service card.

Daemons 14 operate over and interact with kernel 43, which provides a run-time operating environment for user-level processes. Kernel 43 may comprise, for example, a UNIX operating system derivative such as Linux or Berkeley Software Distribution (BSD). Kernel 43 offers libraries and drivers by which daemons 14 may interact with the underlying system. PFE interface 46 of kernel 43 comprises a kernel-level library by which daemons 14 and other user-level processes or user-level libraries may interact with programming interface 64 of PFE 20A. PFE interface 46 may include, for example, a sockets library for communicating with PFE 20A over dedicated network links.

Hardware environment 50 of control unit 18 comprises one or more processors 52 that execute software instructions, such as those used to define a software or computer program including both kernel 43 and user space 40, stored to a computer-readable storage medium (not shown in FIG. 4), such as non-transitory computer-readable mediums including a storage device (e.g., a disk drive, or an optical drive) and/or a memory such as random-access memory (RAM) (including various forms of dynamic RAM (DRAM), e.g., DDR2 SDRAM, or static RAM (SRAM)), Flash memory, another form of fixed or removable storage medium that can be used to carry or store desired program code and program data in the form of instructions or data structures and that can be accessed by a processor, or any other type of volatile or non-volatile memory that stores instructions to cause the one or more processors 52 to perform techniques described herein. Alternatively, or in addition, control unit 18 may include dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Microprocessor 52 may comprise one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein.

RPD 34 executes one or more interior and/or exterior routing protocols to exchange routing information with other network devices and store received routing information in routing information base 45 ("RIB 45"). RIB 45 may include information defining a topology of a network, including one or more routing tables and/or link-state databases. RPD 34 resolves the topology defined by routing information in RIB 45 to select or determine one or more active routes through the network and then installs these routes to forwarding information base 42 ("FIB 42"). Typically, RPD 34 generates FIB 42 in the form of a radix or other lookup tree to map packet information (e.g., header information having destination information and/or a label stack) to next hops and ultimately to interface ports 22 of interface cards associated with respective PFEs 20.

Command line interface daemon 32 ("CLI 32") provides a shell by which an administrator or other management entity may modify the configuration of network aggregation device 12 using text-based commands. Simple Network Management Protocol daemon 36 ("SNMP 36") comprises an SNMP agent that receives SNMP commands from a management entity to set and retrieve configuration and management information for network aggregation device 12. Using CLI 32 and SNMP 36, for example, management entities may enable/disable and configure services, manage classifications and class of service for packet flows, install routes, enable/disable and configure rate limiters, configure traffic bearers for mobile networks, and configure interfaces, for example. RPD 34, CLI 32, and SNMP 36 in this example configure forwarding plane 78B via PFE interface 46.

PFEs 20 process packets by performing a series of operations on each packet over respective internal packet processing paths as the packets traverse the internal architecture of network aggregation device 12. Operations may be performed, for example, on each packet by any of a corresponding ingress interface, an ingress PFE 20, an anchor PFE 20, an egress PFE 20, an egress interface or other components of network aggregation device 12 to which the packet is directed prior, such as one or more service cards. PFEs 20 each include instructions that, when executed, examine the contents of each packet (or another packet property, e.g., incoming interface) and on that basis make forwarding decisions, apply filters, and/or perform accounting, management, traffic analysis, class of service decisions, lawful intercept, and load balancing, for example. In one example, each of PFEs 20 arranges instructions as next hop data that can be chained together as a series of "hops" along an internal packet processing path for the network aggregation device. The result of packet processing determines the manner in which a packet is forwarded or otherwise processed by PFEs 20 from its input physical interface 22 to its output physical interface 22. A particular packet may be processed by multiple PFEs 20.

PFE interface 46 presents an interface by which daemons 19 may configure PFEs 20 with instructions for processing packet flows. Daemons 19 direct PFEs 20 via PFE interface 46 to install IFLs 77 with which PFEs 20 process packet flows. Each of PFEs 20 may include zero or more IFLs 77. PFE interface 46 may comprise one or more user- or kernel-level libraries, programs, toolkits, application programming interfaces (APIs) and may communicate control and data messages to PFEs 20 via internal communication links using sockets, for instance.

For example, CLI 32 may execute a command line interface that receives, from a user, a logical interface configuration for a physical network interface. The logical interface configuration may include configuration data for a pseudowire service interface, logical tunnel interface, logical interface to support VRRP sessions, or distributed network device configuration for one or more cascade ports, as described above with respect to FIG. 1. In response, daemons 19 invoke PFE interface 46 to configure the packet forwarding path to implement the logical interface configuration.

PFE interface 46 allows daemons 19 to drive the installation and configuration of packet processing path 72 of PFE 20A. In particular, PFE interface 46 includes an application programming interface (API) by which daemons 19 may configure processing path 72 with interfaces and instructions and map packet flows to logical interfaces for processing.

PFE 20A, in combination with other PFEs 20 of network aggregation device 12, implements forwarding plane 78B (also known as a "data plane") functionality to handle packet processing from ingress interfaces on which packets are received to egress interfaces to which packets are sent. Forwarding plane 78B determines data packet forwarding through network aggregation device 12, applies services, rate limits packet flows, filters packets, and otherwise processes the packets using instructions and lookup data installed by control plane 78A to forwarding plane 78B. While FIG. 4 illustrates only PFE 20A in detail, each of PFEs 20 of network aggregation device 12 comprises similar modules that perform substantially similar functionality.

PFE 20A includes application-specific integrated circuit (ASIC)-based packet processors ("ASICs 68") that map packets internal forwarding paths of processing path 72 and execute processing path 72 in accordance with techniques described herein. ASICs 68 include one or more programmable application-specific integrated circuits having key engines that execute microcode (or "microinstructions") to control and apply fixed hardware components of ASICs 68 to process packet "keys." A packet key includes packet fields and other parameters that determine a flow of packet processing for the packet along an internal processing path configured in processing path 72. Key engines include key buffers to store packet field data for corresponding packets that the key engine is currently processing. Key buffers may also provide limited writable memory to which elements of the internal processing path may write to pass messages accessible by future elements. Some instances of ASICs 68 may include a plurality of key engines each having an associated key buffer and record buffer.

PFE microprocessor 62 manages ASICs 68 and executes programming interface 64 to provide an interface for/to control unit 18. PFE microprocessor 62 may execute a microkernel to provide an operating environment programming interface 64 and other software. Programming interface 64 receives messages from control unit 18 directing packet forwarding engine 20A to configure the elements of processing path 72.

Internal processing path 72 ("processing path 72") of ASICs 68 comprises elements including programmable, executable microcode and fixed hardware components that determine the packet processing actions and other operations performed by ASICs 68. Processing path 72 may include, for example, executable instructions, programmable logic, and application-specific logic that perform lookups, rate limit packet flows, count packets, implement classes of service, perform lawful intercept, classify packets, apply filters, route packets, and manipulate packet keys, among other functions. PFE 20A may store executable instructions of processing path 72 in computer-readable storage media, such as static random-access memory (SRAM). While illustrated within ASICs 68, executable instructions of processing path 72 may be stored in memory external to ASICs 68 onboard PFE 20A.

In some aspects, one or more instructions of processing path 72 comprise a next hop data structure to initiate processing. At the end of each processing step by ASICs 68, the result is a next hop that may specify additional processing or the termination of processing, for instance. In addition, next hops may specify one or more functions to be executed by ASICs 68 and/or one or more hardware elements to be applied (e.g., policers). Next hops thus form the primary data structure that can be used to initiate a service, chain next hops to allow for multiple processing steps to be performed with respect to a single packet and terminate an internal processing path.

In the illustrated example, processing path 72 includes elements in the form of executable instructions and lookup data structures, in some cases configured as interfaces, that define processing paths for packets received at a particular physical network interface 22A. Processing path 72 includes device interface (IFD) 75, VLAN table 76, context table 38, a selector block 83, and logical interfaces (IFLs) 77A-77C. Device interface (IFD) 75 may include device-specific instructions for the physical network interface 22A for processing all packets received at physical network interface 22A.

VLAN table 76 of FIG. 4 represents functionality configured to access is a list of one or more VLAN-IDs that each maps to a logical interface 77 configured for the physical network interface 22A and device interface 75. The VLAN-IDs may represent Customer VLANs (C-VLANs) or Service or Subscriber VLANs (S-VLANs) in some examples. ASICs 68 process packets received at physical interface 22A by querying VLAN table 76 using VLAN tags included in the packets to identify the appropriate IFL 77 with which to process the packet.

In accordance with the techniques of the disclosure, processing path 72 further includes context table 38. Context table 38 may define a plurality of entries that each specify a next hop address for a plurality of customer devices 10 of FIG. 1. ASICs 68 may use the plurality of entries of context table 38 to identify an address of a next hop to which to forward traffic received from a VLAN that terminates at one of IFLs 77 and destined for customer device 10. In some examples, the plurality of entries are a plurality of EVI Ethernet AD routes that specify an address of one network access device 11 of a plurality of network access devices.

Logical interfaces 77A-77C ("IFLs 77") represents one or more logical interfaces for which ASICs 68 are configured to apply logical interface-specific operations to packets mapped to the logical interfaces. In some examples, each logical interface 77 is configured to be associated with a particular VLAN-ID. ASICs 68 processes packets received at physical interface 22A using logical interface 77A. Each of IFLs 77 has corresponding logical properties specific to that interface, such as protocol families running on the interface (including protocol-specific Maximum Transmission Units (MTUs)), IP address(es) associated with the interface, VLAN tags, and filters and/or routing policies operating on the interface.

The number of IFLs 77 may be limited in various implementations of PFE 20A due to memory restrictions, the rate at which PFE microprocessor 62 can establish paths in processing path 72, the bandwidth between control unit 18 and PFE 20A, and the rate at which control unit 18 can allocate instructions and determine paths in processing path 72. Each of IFLs 77 represents a logical interface to an interface-specific processing path of processing paths 72 for execution by ASICs 68.

In some examples, control unit 18 receives, from network access device 11, a message indicating that a link between customer device 10 and network access device 11 corresponding to a particular VLAN or network service is disabled. In some examples, the message is a withdrawal of an EVPN per-EVI Ethernet AD route. In response to receiving the message, control unit 18 withdraws network access device 11 from context table 38 as the next hop for customer device 10 for network traffic of the particular VLAN or network service. For example, control unit 18 deletes an entry from context table 38 that specifies network access device 11 as a next hop to which to forward traffic associated with the particular VLAN or network service and destined for customer device 10. In some examples, control unit 18 deletes an EVI Ethernet AD route from RIB 45 advertised by network access device 11 that specifies network access device 11 as a next hop to which to forward traffic associated with the particular VLAN or network service and destined for customer device 10. In some examples, the Ethernet tag of the EVI Ethernet AD route specifies an VLAN identifier for the VLAN on which the service corresponding to the failed link executes. In some examples, control unit 18 updates a Forwarding Information Base (FIB) and context table to identify a next-hop to which to forward traffic associated with the particular VLAN or network service and destined for customer device 10. In some examples, if the impacted entry in the context table is an ECMP next-hop, then control unit 18 updates the ECMP next-hop by removing the path to network access device 11 such that a secondary next-hop may take precedence for the traffic associated with the particular VLAN or network service and destined for customer device 10. Alternatively, if the next-hop entry in the context table points only to network access device 11, then control unit 18 removes the next hop from the context table such that the traffic associated with the particular VLAN or network service and destined for customer device 10 is dropped.

In another example, and with reference to the multihomed NETWORK SYSTEM 200 of FIG. 2, control unit 18 may provide link failure detection on a per-VLAN, per-subscriber, or per-service basis for traffic going in the direction of a PS logical service interface to, e.g., network access device 11A. Control unit 18 may create different next-hops that are based on a per-EVI AD route that control unit 18 receives from each network access device 11A, 11B. For example, if control unit 18 receives a per-EVI AD route for a particular VLAN from each of network access devices 11A, 11B, then control unit 18 may build, in context table 38, an ECMP next-hop route containing the paths to each of network access devices 11A, 11B. If control unit 18 receives a per-EVI AD route for another VLAN from only one network access device, e.g., network access device 11A, then control unit 18 builds, in context table 38, a second next-hop route that contains only one path to network access device 11A.

In some examples, each next-hop route of the E-LINE service includes a PS logical transport Interface prefix that is dynamically bound to different next-hops. The prefix is based on a VLAN or VLANs specified by a data packet originating from a logical service interface of a PS and destined for customer device 10 via network access devices 11A, 11B. Control unit 18 may use a PS logical service interface to dynamically bind a PS logical transport interface to a different next-hop based on the VLAN(s) according to the following procedure:

To maintain 1:1 mapping between a VLAN or VLANs (QinQ) and a next-hop, each next-hop is bound to a corresponding PS logical service interface. Because the VLAN or VLAN(s) (QinQ) specified by a data packet originating from PS logical service 18A of FIG. 2 uniquely matches a VLAN or VLAN(s) configured for that PS logical service interface, a route is installed for each PS logical service interface:

PS logical service interface x→next hop y

In some examples, two different PS logical service interfaces may share the same next-hop because the next-hop is determined by whether control unit 18 receives a per-EVI Ethernet AD route for a VLAN corresponding to the two different PS logical service interfaces from the same network access device (e.g., network access device 11A) or the same set of network access devices 11A, 11B. In some examples, the PS logical service interface routes are kept in a separate context table 38. Control unit 18 creates a next-hop table associated with the corresponding VLAN(s) based on the PS logical service interface routes.

Control unit 18 installs a route with a PS logical service interface prefix with a next-hop pointing to a network device specified by a corresponding entry in context table 38. For traffic received from a PS logical service interface and by the PS logical transport interface, control unit 18 may perform a route lookup in the context table. For example, to perform a route lookup for a data packet in the context table, control unit 18 uses a VLAN(s) specified by the data packet is used as a key to retrieve a next-hop entry from context table 38. In response to finding a match, control unit 18 determines a corresponding next-hop for the data packet. In response to not finding a match, network aggregation device 12 discards the traffic.

When combined with a VLAN-signaled FXC service, the techniques of the disclosure may achieve VLAN-aware services for PWHT with a PS interface. In some examples, single- and multihomed customer devices 10A, 10B share the same VPWS Service Tunnel 13A, 13B. The techniques described above may be used as control unit 18 creates different next-hops based on per-EVI Ethernet AD routes associated with VLAN(s) of received traffic. Further, control unit 18 may dynamically bind a PS service interface to a next-hop based on the VLAN carried in the data packet.

Accordingly, if a link between customer device 10 and network access device 11 suffers a failure, the techniques of the disclosure allow for network access device 11 to gracefully signal the failure by issuing a message that causes network aggregation device 12 to withdraw, from a RIB of network aggregation device 12, a per-EVI Ethernet AD route advertised by network access device 11 for customer device 10. Furthermore, after withdrawing the route, network aggregation device 12 updates a next-hop in a context table for a corresponding service so as to drop traffic to be forwarded to network access device 11 and destined for customer device 10 or to redirect such traffic to a different network access device. Thus, the techniques of the disclosure may avoid sending network traffic across EVPN VPWS tunnel 13 that network access device 11 is unable to forward, thereby reducing network congestion on EVPN VPWS tunnel 13.

Figure 5:
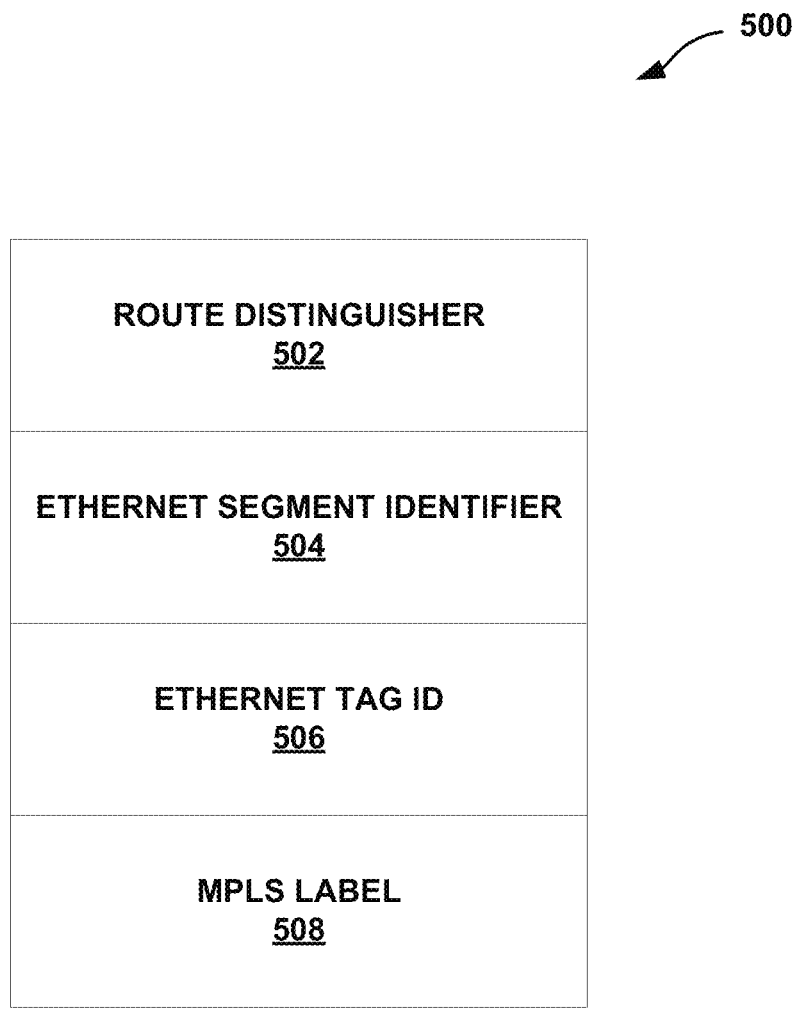
FIG. 5 is a block diagram illustrating an example Ethernet Auto-Discovery (AD) route in accordance with the techniques of the disclosure.

FIG. 5 is a block diagram illustrating example Ethernet AD route 500 in accordance with the techniques of the disclosure. In some examples, Ethernet AD route 500 is an inner label, or "service label," of an MPLS label stack that provides EVPN-specific configuration information. Example Ethernet AD route 500 may include an 8-octet Route Distinguisher 502, a 10-octet Ethernet Segment Identifier 504, a 4-octet Ethernet Tag ID, and a 3-octet MPLS label. Other examples of an Ethernet AD route in accordance with the techniques of the disclosure are contemplated that may have additional, or different fields of similar or different length not expressly disclosed herein.

Figure 6:
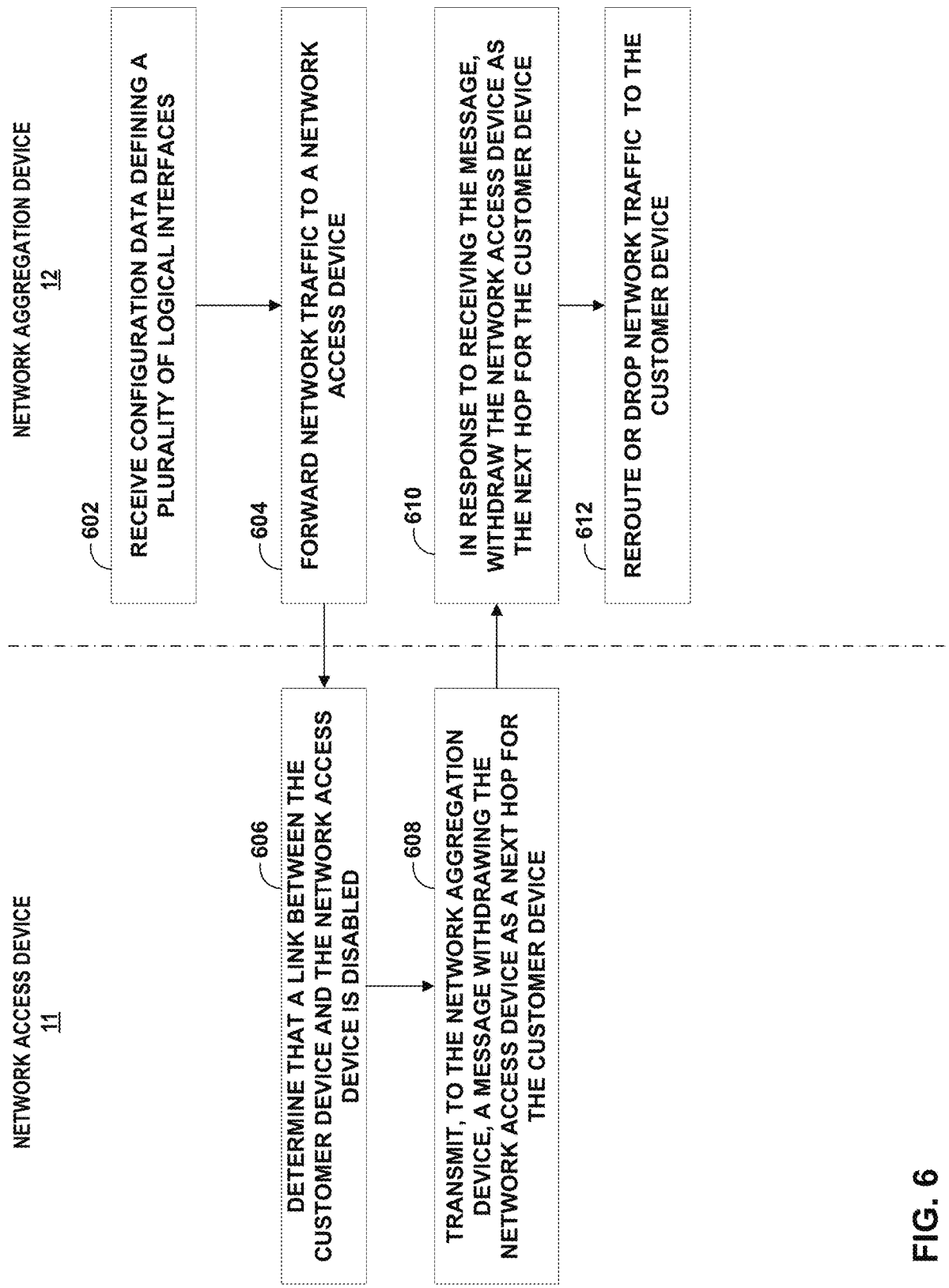
FIG. 6 depicts an example operation in accordance with the techniques of the disclosure.

FIG. 6 depicts an example operation in accordance with the techniques of the disclosure. FIG. 6 is described with respect to system 2 of FIG. 1 for convenience. However, other systems, such as system 200 of FIG. 2 may perform the operation of FIG. 6.

In the example of FIG. 6, network aggregation device 12 receives configuration data defining a plurality of logical interfaces for respective services 18 available via the network aggregation device 12 (602). In some examples, each logical interface of the plurality of logical interfaces is associated with a different VLAN of a plurality of VLANs corresponding to respective services 18. Each of logical interfaces 16 may use a different VLAN-ID as a virtual circuit identifier, and the scope of the VLAN-ID may be local to the physical network interface 14. For example, a first logical interface is associated with a first VLAN that corresponds to service 18A, which may provide a firewall service to customer device 10. Further, a second logical interface is associated with a second VLAN that corresponds to service 18N, which may provide an HTTP filtering service to customer device 10

In the example of FIG. 6, network access device 11 is configured as a next hop for traffic from service 18A (e.g., the first VLAN) and destined for customer device 10. Network aggregation device 12 forwards network traffic originating from service 18A and destined for customer device 10 to network access device 11 via EsVPN VPWS tunnel 13 (604). Network access device 11 determines that a link between customer device 10 and network access device 11 is disabled (606). In response to determining that the link is disabled, network access device 11 transmits, to network aggregation device 12, a message withdrawing network access device 11 as a next hop for traffic originating from service 18A and destined for customer device 10 (608). In some examples, in response to determining that the link is disabled, network access device 11 withdraws an EVPN route for service 18A that specifies network access device 11 as a next hop for customer device 10.

Network aggregation device 12 receives the message, and in response to receiving the message, withdraws network access device 11 as the next hop for traffic originating from service 18A and destined for customer device 10 (610). For example, network aggregation device 12 withdraws, from a context table of next hops for a plurality of customer devices, a per-EVI Ethernet AD route originated by network access device 11 and specifying network access device 11 as a next hop for traffic originating from service 18A and destined for customer device 10.

Subsequently, network aggregation device 12 receives network traffic originating from service 18A and destined for customer device 10. In some examples, such as is depicted in the example of FIG. 2, network aggregation device 12 reroutes network traffic originating from service 18A and destined for customer device 10A from network access device 11A and to network access device 11B that acts as a next hop for network traffic originating from service 18A and destined for customer device 10A. For example, upon removing the per-EVI Ethernet AD route originated by network access device 11, if network aggregation device 12 includes a second entry for the next hop of service 18A designating network access device 11B, then network aggregation device 12 reroutes network traffic originating from service 18A and destined for customer device 10A from network access device 11A and to network access device 11B. In some examples, network aggregation device 12 drops the network traffic originating from service 18A and destined for customer device 10 (612). For example, upon removing the per-EVI Ethernet AD route originated by network access device 11, if network aggregation device 12 does not include another entry for the next hop of service 18A, drops the network traffic originating from service 18A and destined for customer device 10.

Accordingly, if a link between customer device 10 and network access device 11 suffers a failure, the techniques of the disclosure allow for network access device 11 to gracefully signal the failure by issuing a message that causes network aggregation device 12 to withdraw, from a RIB of network aggregation device 12, a per-EVI Ethernet AD route advertised by network access device 11 for customer device 10. Furthermore, after withdrawing the route, network aggregation device 12 updates a next-hop in a context table for a corresponding service so as to drop traffic to be forwarded to network access device 11 and destined for customer device 10 or to redirect such traffic to a different network access device. In another example, the techniques of the disclosure allow for network aggregation device 12 to redirect traffic originating from service 18A that is to be forwarded to network access device 11A and destined for customer device 10A to network access device 11B for forwarding to customer device 10A. Thus, the techniques of the disclosure may avoid sending network traffic from service 18A across EVPN VPWS tunnel 13 that network access device 11 is unable to forward to customer device 10, thereby reducing network congestion on EVPN VPWS tunnel 13.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a non-transitory computer-readable medium or computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals or carrier waves, although the term "computer-readable media" may include transient media such as signals, in addition to physical storage media.

Various examples have been described. These and other examples are within the scope of the following claims.

What is claimed is:

1. A first network device configured to:
signal, to a second network device, and using Ethernet Virtual Private Network (EVPN) route advertisements, a multi-service service tunnel to transport network packets for a plurality of services, wherein the first network device is configured with a single transport interface for the service tunnel, the single transport interface configured with a plurality of service interfaces for the plurality of services;
in response to receiving an EVPN route withdrawal message for the service tunnel that identifies a service of the plurality of services that corresponds to a failed service interface of the plurality of service interfaces configured for the single transport interface for the service tunnel, update a route for the service identified in the EVPN route withdrawal message; and
forward network packets for the plurality of services in accordance with the updated route.

2. The first network device of claim 1, wherein the service tunnel comprises a pseudowire.

3. The first network device of claim 1, wherein the service tunnel comprises a Virtual Private Wire Service (VPWS) tunnel.

4. The first network device of claim 1, wherein the EVPN route withdrawal message comprises an Ethernet AD route comprising an Ethernet tag that identifies the service of the plurality of services that corresponds to the failed service interface of the plurality of service interfaces.

5. The first network device of claim 1, wherein to signal the multi-service service tunnel to transport the network packets for the plurality of services, the first network device is configured to receive, for each service of the plurality of services, a different EVPN route advertisement for the service tunnel that identifies the service.

6. The first network device of claim 1, wherein the first network device is further configured to forward network packets received via the plurality of service interfaces for the plurality of services to the service tunnel.

7. The first network device of claim 1, wherein the first network device is further configured to configure the single transport interface to add a service interface for the service.

8. The first network device of claim 1,
wherein the service tunnel is a first service tunnel, and
wherein the first network device is further configured to signal, to a third network device, a second multi-service service tunnel, and
wherein to forward the network packets for the plurality of services in accordance with the updated route, the first network device is configured to forward the network packets for the service identified in the EVPN route withdrawal message to the third network device via the second service tunnel.

9. The first network device of claim 8,
wherein a context table for the single transport interface maps each service of the plurality of services to at least one of the first service tunnel and the second service tunnel,
wherein the EVPN route withdrawal message is a first EVPN route withdrawal message,
wherein the service identified in the first EVPN route withdrawal message is a first service; and wherein the first network device is configured to update, in response to receiving a second EVPN route withdrawal message for the first service tunnel that identifies a second service of the plurality of services that corresponds to a failed second service interface of the plurality of service interfaces, a route for the second service identified in the second EVPN route withdrawal message.

10. A non-transitory, computer-readable medium comprising instructions that, when executed, cause one or more processors of a first network device to:
  signal to a second network device, and using Ethernet Virtual Private Network (EVPN) route advertisements, a multi-service service tunnel to transport network packets for a plurality of services, wherein the first network device is configured with a single transport interface for the service tunnel, the single transport interface configured with a plurality of service interfaces for the plurality of services;
  in response to receiving an EVPN route withdrawal message for the service tunnel that identifies a service of the plurality of services that corresponds to a failed service interface of the plurality of service interfaces configured for the single transport interface for the service tunnel, update a route for the service identified in the EVPN route withdrawal message; and
  forward network packets for the plurality of services in accordance with the updated route.

11. The computer-readable medium of claim 10, wherein the service tunnel comprises a pseudowire.

12. The computer-readable medium of claim 10, wherein the service tunnel comprises a Virtual Private Wire Service (VPWS) tunnel.

13. The computer-readable medium of claim 10, wherein the EVPN route withdrawal message comprises an Ethernet AD route comprising an Ethernet tag that identifies the service of the plurality of services that corresponds to the failed service interface of the plurality of service interfaces.

14. The computer-readable medium of claim 10, wherein to signal the service tunnel to transport the network packets for the plurality of services, the instructions cause the one or more processors to receive, for each service of the plurality of services, a different EVPN route advertisement for the service tunnel that identifies the service.

15. The computer-readable medium of claim 10, wherein the service tunnel is a first service tunnel, and wherein the instructions cause the one or more processors to signal, to a third network device, a second multi-service service tunnel, and
  wherein to forward the network packets for the plurality of services in accordance with the updated route, the instructions cause the one or more processors to forward the network packets for the service identified in the EVPN route withdrawal message to the third network device via the second service tunnel.

16. A non-transitory, computer-readable medium comprising instructions that, when executed, cause one or more processors of a first network device to:
  signal, to a second network device and using Ethernet Virtual Private Network (EVPN) route advertisements, a multi-service service tunnel to transport network packets for a plurality of services, wherein the first network device is configured with a single transport interface for the service tunnel, the single transport interface configured with a plurality of service interfaces for the plurality of services;
  detect failure of a failed service interface of the plurality of service interfaces; and
  output, to the second network device in response to the failure, an EVPN route withdrawal message for the service tunnel that identifies a service of the plurality of services that corresponds to the failed service interface of the plurality of service interfaces configured for the single transport interface for the service tunnel.

17. The computer-readable medium of claim 16, wherein the service tunnel comprises a pseudowire.

18. The computer-readable medium of claim 16, wherein the service tunnel comprises a Virtual Private Wire Service (VPWS) tunnel.

19. The computer-readable medium of claim 16, wherein to signal the service tunnel to transport the network packets for the plurality of services, the instructions cause the one or more processors to receive, for each service of the plurality of services, a different EVPN route advertisement for the service tunnel that identifies the service.

20. The computer-readable medium of claim 16, wherein the EVPN route withdrawal message comprises an Ethernet AD route comprising an Ethernet tag that identifies the service of the plurality of services that corresponds to the failed service interface of the plurality of service interfaces.

* * * * *